US012646410B2

(12) United States Patent
Leung et al.

(10) Patent No.: US 12,646,410 B2
(45) Date of Patent: Jun. 2, 2026

(54) SYSTEMS AND METHODS FOR FRAUD PREVENTION BASED ON VIDEO ANALYTICS

(71) Applicant: Quanata, LLC, San Francisco, CA (US)

(72) Inventors: Theobolt N. Leung, San Francisco, CA (US); Vinay Kumar, Fremont, CA (US); Holger Struppek, San Francisco, CA (US); Scott Howard, Emeryville, CA (US); Kenneth J. Sanchez, San Francisco, CA (US); John Minichiello, Monticello, FL (US)

(73) Assignee: QUANATA, LLC, San Francisco, CA (US)

( * ) Notice: Subject to any disclaimer, the term of this patent is extended or adjusted under 35 U.S.C. 154(b) by 0 days.

(21) Appl. No.: 18/921,723

(22) Filed: Oct. 21, 2024

(65) Prior Publication Data

US 2025/0046186 A1 Feb. 6, 2025

Related U.S. Application Data

(63) Continuation of application No. 18/212,730, filed on Jun. 22, 2023, now Pat. No. 12,125,383, which is a
(Continued)

(51) Int. Cl.
*G08G 1/0967* (2006.01)
*G06V 20/52* (2022.01)
(Continued)

(52) U.S. Cl.
CPC ....... *G08G 1/096775* (2013.01); *G06V 20/52* (2022.01); *G07C 5/008* (2013.01);
(Continued)

(58) Field of Classification Search
CPC ........... G08G 1/096775; G08G 1/0112; G08G 1/0141; G08G 1/096716; G08G 1/096741;
(Continued)

(56) References Cited

U.S. PATENT DOCUMENTS 7,813,944 B1 10/2010 Luk et al.
8,117,049 B2 2/2012 Berkobin et al.
(Continued)

FOREIGN PATENT DOCUMENTS

CN 103810637 5/2014
TW 201421425 A * 6/2014
WO 2017176304 10/2017

OTHER PUBLICATIONS

<https://gilsmethod.com/how-to-create-albums-and-upload-pictures-to-facebook-on-your-iphone>. GilsMethod, Oct. 5, 2019. Oct. 2019.
(Continued)

*Primary Examiner* — Ryan W Sherwin
(74) *Attorney, Agent, or Firm* — BRYAN CAVE LEIGHTON PAISNER LLP

(57) ABSTRACT

A computer-implemented method including receiving an image for evaluation, the image includes video and/or still image data; analyzing the image to extract profile features using a pattern recognition or a facial recognition algorithm, an object recognition, and/or an object character recognition, the profile features include first profile features related to a vehicle and second profile features related to an image verification indicator, the second profile features include one or more features related to an identity of a user; generating an image verification score including a first comparison and a second comparison of at least a portion of one or more of the first profile features and at least a portion of one or more of the second profile features, respectively, and the image
(Continued)

verification indicator; and updating a vehicle profile when the image verification score satisfies a threshold of similarity based on the comparisons.

20 Claims, 17 Drawing Sheets

Related U.S. Application Data continuation of application No. 17/853,817, filed on Jun. 29, 2022, now Pat. No. 11,735,043, which is a continuation of application No. 16/667,762, filed on Oct. 29, 2019, now Pat. No. 11,417,208.

(51) Int. Cl.

| | |
|---|---|
| *G07C 5/00* | (2006.01) |
| *G08G 1/01* | (2006.01) |
| *H04W 4/029* | (2018.01) |

(52) U.S. Cl.
CPC ......... *G08G 1/0112* (2013.01); *G08G 1/0141* (2013.01); *G08G 1/096716* (2013.01); *G08G 1/096741* (2013.01); *H04W 4/029* (2018.02)

(58) Field of Classification Search
CPC ......... G08G 1/09675; G08G 1/096725; G06V 20/52; G06V 10/771; G06V 20/56; G07C 5/008; H04W 4/029; H04W 4/025; H04W 4/44; G06Q 10/0635; G06Q 40/08; H04L 67/30
See application file for complete search history.

(56) References Cited

U.S. PATENT DOCUMENTS

| | | | |
|---|---|---|---|
| 9,047,778 | B1 | 6/2015 | Cazanas et al. |
| 9,151,692 | B2 | 10/2015 | Breed |
| 9,275,417 | B2 | 3/2016 | Binion et al. |
| 9,299,108 | B2 | 3/2016 | Diana et al. |
| 9,311,676 | B2 | 4/2016 | Helitzer et al. |
| 9,679,487 | B1 | 6/2017 | Hayward |
| 9,712,549 | B2 | 7/2017 | Almurayh |
| 9,870,448 | B1 | 1/2018 | Myers et al. |
| 9,904,928 | B1 | 2/2018 | Leise |
| 9,984,419 | B1 | 5/2018 | Manzella et al. |
| 9,984,420 | B1 | 5/2018 | Manzella et al. |
| 10,026,130 | B1 | 7/2018 | Konrardy et al. |
| 10,032,225 | B1 | 7/2018 | Fox et al. |
| 10,055,794 | B1 | 8/2018 | Konrardy et al. |
| 10,086,782 | B1 | 10/2018 | Konrardy et al. |
| 10,089,693 | B1 | 10/2018 | Konrardy et al. |
| 10,102,590 | B1 | 10/2018 | Farnsworth et al. |
| 10,106,083 | B1 | 10/2018 | Fields et al. |
| 10,134,278 | B1 | 11/2018 | Konrardy et al. |
| 10,156,848 | B1 | 12/2018 | Konrardy et al. |
| 10,157,423 | B1 | 12/2018 | Fields et al. |
| 10,163,327 | B1 | 12/2018 | Potter et al. |
| 10,163,350 | B1 | 12/2018 | Fields et al. |
| 10,166,994 | B1 | 1/2019 | Fields et al. |
| 10,168,703 | B1 | 1/2019 | Konrardy et al. |
| 10,181,161 | B1 | 1/2019 | Konrardy et al. |
| 10,185,997 | B1 | 1/2019 | Konrardy et al. |
| 10,185,998 | B1 | 1/2019 | Konrardy et al. |
| 10,185,999 | B1 | 1/2019 | Konrardy et al. |
| 10,269,017 | B1 | 4/2019 | Phillips et al. |
| 10,269,074 | B1 | 4/2019 | Patel et al. |
| 10,354,333 | B1 | 7/2019 | Hayward |
| 10,410,289 | B1 | 9/2019 | Tofte et al. |
| 10,534,968 | B1 | 1/2020 | Clauss et al. |
| 10,832,327 | B1 | 11/2020 | Potter et al. |
| 11,216,888 | B2 | 1/2022 | Perl et al. |
| 11,373,249 | B1 | 6/2022 | Hayward et al. |
| 11,417,208 | B1 | 8/2022 | Leung et al. |
| 11,735,043 | B2 | 8/2023 | Leung et al. |
| 2002/0140577 | A1* | 10/2002 | Kavner ............... G07B 15/063 |
| | | | 340/928 |
| 2003/0200123 | A1 | 10/2003 | Burge et al. |
| 2004/0243423 | A1 | 12/2004 | Rix et al. |
| 2006/0056658 | A1* | 3/2006 | Kavner ............... G07B 15/063 |
| | | | 382/105 |
| 2008/0031522 | A1* | 2/2008 | Axemo ................. G08G 1/017 |
| | | | 382/181 |
| 2008/0243558 | A1 | 10/2008 | Gupte |
| 2010/0088123 | A1 | 4/2010 | Mccall et al. |
| 2010/0145734 | A1 | 6/2010 | Becerra et al. |
| 2012/0076437 | A1 | 3/2012 | King |
| 2012/0155712 | A1* | 6/2012 | Paul .................... G06V 20/625 |
| | | | 382/105 |
| 2013/0287265 | A1* | 10/2013 | Nepomniachtchi ......................... |
| | | | G06Q 20/3276 |
| | | | 382/115 |
| 2013/0297353 | A1* | 11/2013 | Strange ................. G06Q 40/08 |
| | | | 705/4 |
| 2014/0081675 | A1 | 3/2014 | Ives et al. |
| 2014/0270383 | A1* | 9/2014 | Pederson .............. G08G 1/207 |
| | | | 382/104 |
| 2014/0324745 | A1* | 10/2014 | Leppanen ............. G06V 40/20 |
| | | | 706/12 |
| 2014/0350970 | A1 | 11/2014 | Schumann, Jr. et al. |
| 2015/0039397 | A1 | 2/2015 | Fuchs |
| 2015/0179062 | A1 | 6/2015 | Ralston et al. |
| 2015/0204684 | A1 | 7/2015 | Rostamian et al. |
| 2015/0363886 | A1 | 12/2015 | Fernandes et al. |
| 2015/0375756 | A1 | 12/2015 | Do et al. |
| 2016/0001544 | A1 | 1/2016 | Gydesen |
| 2016/0300414 | A1* | 10/2016 | Lambert ................. G07C 9/00 |
| 2017/0075740 | A1 | 3/2017 | Breaux et al. |
| 2017/0089710 | A1 | 3/2017 | Slusar |
| 2017/0109827 | A1 | 4/2017 | Huang et al. |
| 2017/0192428 | A1 | 7/2017 | Vogt et al. |
| 2017/0200367 | A1 | 7/2017 | Mielenz |
| 2017/0212511 | A1 | 7/2017 | Paiva et al. |
| 2017/0270615 | A1 | 9/2017 | Fernandes et al. |
| 2017/0270617 | A1 | 9/2017 | Fernandes et al. |
| 2017/0278311 | A1* | 9/2017 | Vespia .................. G06V 20/52 |
| 2017/0293894 | A1 | 10/2017 | Taliwal et al. |
| 2017/0372143 | A1* | 12/2017 | Barcus ................... G06V 20/54 |
| 2018/0070290 | A1 | 3/2018 | Breaux et al. |
| 2018/0070291 | A1 | 3/2018 | Breaux et al. |
| 2018/0182039 | A1 | 6/2018 | Wang et al. |
| 2018/0194343 | A1 | 7/2018 | Lorenz |
| 2018/0307250 | A1 | 10/2018 | Harvey |
| 2018/0338231 | A1* | 11/2018 | Johnson ............... G06V 40/172 |
| 2019/0066492 | A1* | 2/2019 | Nijhuis ................. G06V 20/52 |
| 2019/0102840 | A1 | 4/2019 | Perl et al. |
| 2021/0042844 | A1 | 2/2021 | Potter et al. |
| 2021/0078629 | A1 | 3/2021 | Boss et al. |
| 2021/0350470 | A1* | 11/2021 | Lambert .............. G06T 7/0004 |

OTHER PUBLICATIONS

<https://www.dummies.com/social-media/facebook/how-to-edit-a-facebook-album/>. Dummies. Oct. 15, 2019. Oct. 15, 2019.

<https://grytics.com/blog/create-album-facebook-groups/>. Grytics. Oct. 15, 2019. Oct. 2019.

<https://www.socmedsean.com/updated-facebook-tip-organizing-moving-and-editing-your-photos-and-albums/. SocMedSean. Oct. 15, 2019. Oct. 2019.

<https://www.thesocialmediahat.com/blog/how-to-update-your-new-mobile-facebook-profile/>. The Social Media Hat, Oct. 15, 2019. Oct. 2019.

Aleksandrowicz, P., Verification of motor vehicle post accident insurance claims. University of Science and Technology, Institute of Automation and Transport, Machine Maintenance Department, vol. 15, No. 1, 2020, pp. 25-38. 2020.

Fidelity.com, "Mobile Check Deposit", Deposit checks on the go. Just snap a photo of a check with your iPhone (Registered), iPad(Registered), or AndroidTM device to make deposits directly into the Fidelity account of your choice, Copyright 1998-2019 FMR

(56)           References Cited

OTHER PUBLICATIONS

LLC, pp. 1-2. Retrieved from the Internet on: Aug. 15, 2019: https://www.fidelity.com/mobile/mobile-check-deposit Aug. 2019.

Teadtools.com, "Credit Card Recognition SOK Technology", Copyright 2019 LEAD Technologies, Inc, pp. 1-2. Retried from the Internet on Aug. 15, 2019: https://www.leadtools.com/sdk/forms/credit-card Aug. 2019.

Li et al., An Anti-Fraud System for Car Insurance Claim Based on Visual Evidence, Retrieved from https://arxiv.org/pdf/1804.11207, Apr. 2018, 6 pages. Apr. 2018.

Ruchi Verma and Sathyan Ramakrishna Mani, "Using Analytics for Insurance Fraud Detection", Digital Transformation, pp. 1-10.

Truepic.com, "Photo and Video Verification You Can Trust", 2019 World Economic Forum Tech Pioneer, pp. 1-4. Retired from the Internet on Aug. 15, 2019: https://truepic.com/ 2019.

Peng, J., et al., "Usage-based insurance system based on carrier-cloud-client," 2015 10th International Conference on Communications and Networking in China (ChinaCom) 2015, pp. 579-584, (Usage) 2015.

\* cited by examiner

300

9:41 AM    *100%

← 🗑 ✉ ⋮

Welcome to HiRoad! | Add label | ☆

⋮

HiRoad!        It pays to be you

Welcome to HiRoad.

VERIFY EMAIL

After verifying your email,
download the app.
Log in to the HiRoad app on the
date your policy starts, and start
earning monthly driver discounts!

9:41 AM    *100%
quote.hiroad.com

HiRoad!

Thanks!
Your email address has been
confirmed.

Now add some pics of your car:
policy.hiroad.com

We hope it'll never happen, but adding some
pics now could save you a lot of hassle in a
future incident.

HiRoad!

FIG. 3B

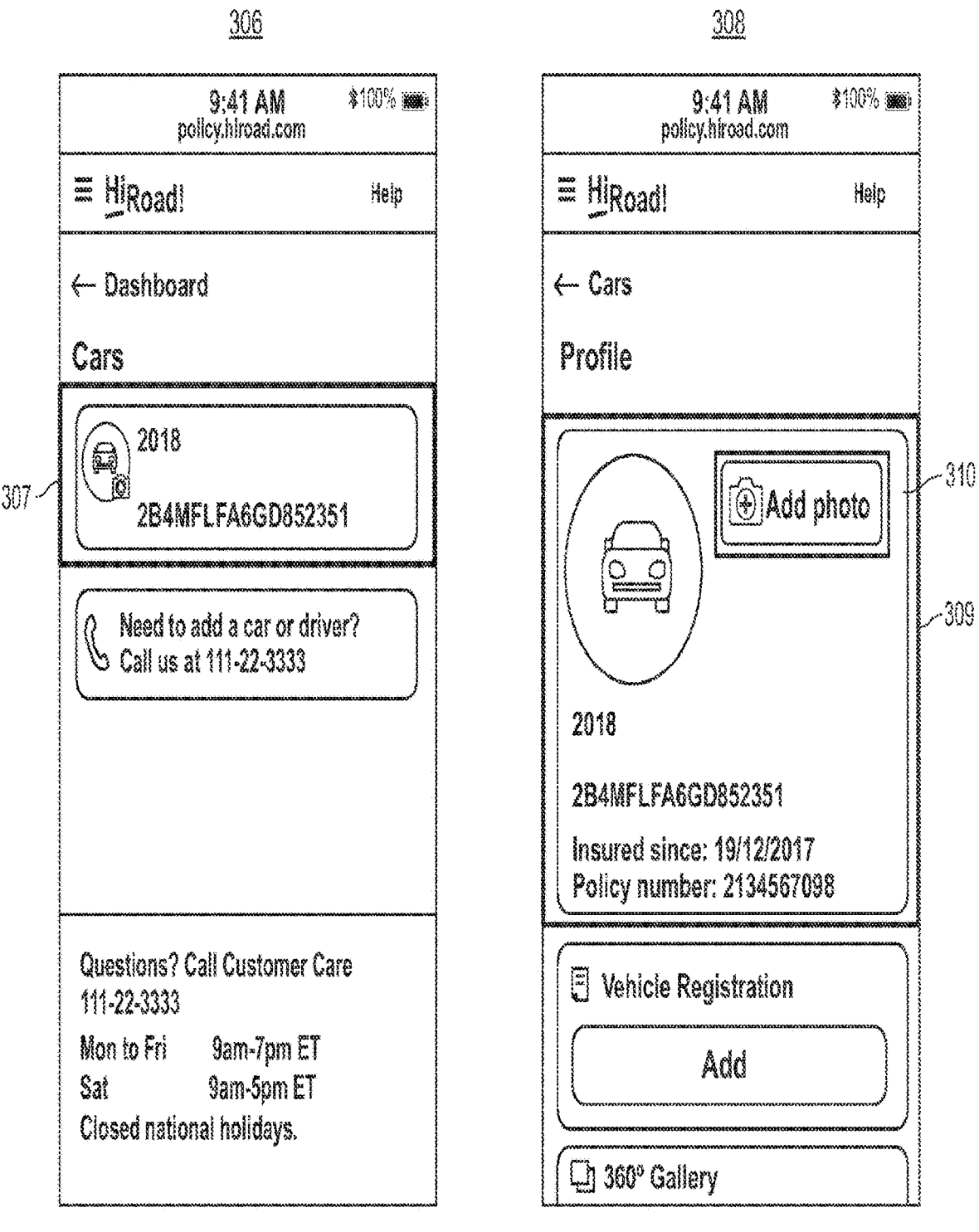
FIG. 3E           FIG. 3F

Figures 3I, 3J:
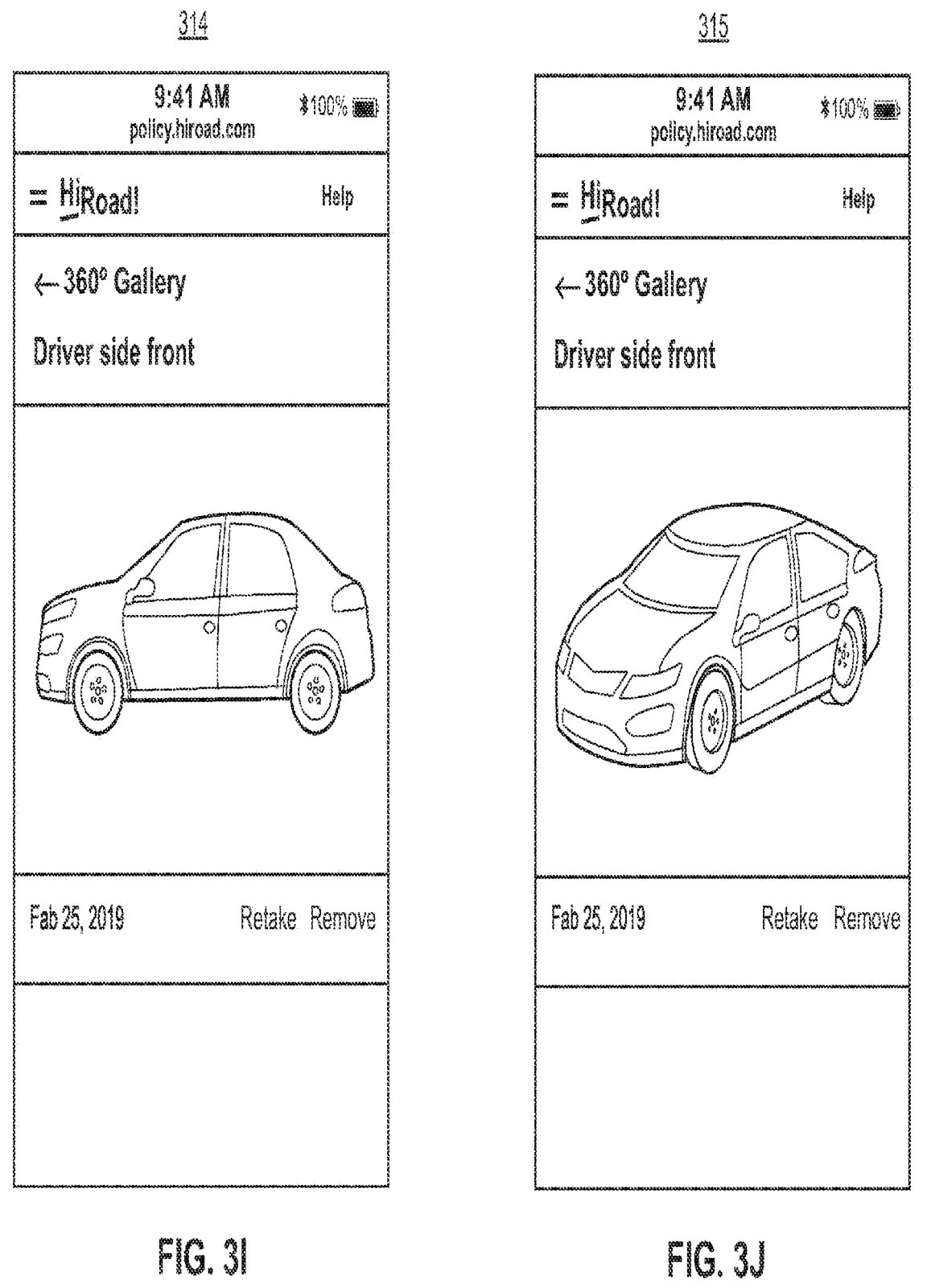

314

9:41 AM                    ✻100% ▬▬
policy.hiroad.com

☰ HiRoad!                      Help

← 360° Gallery

Driver side front

Fab 25, 2019          Retake  Remove

9:41 AM                    ✻100% ▬▬
policy.hiroad.com

☰ HiRoad!                      Help

← 360° Gallery

Driver side front

Fab 25, 2019          Retake  Remove

Figures 3K, 3L:
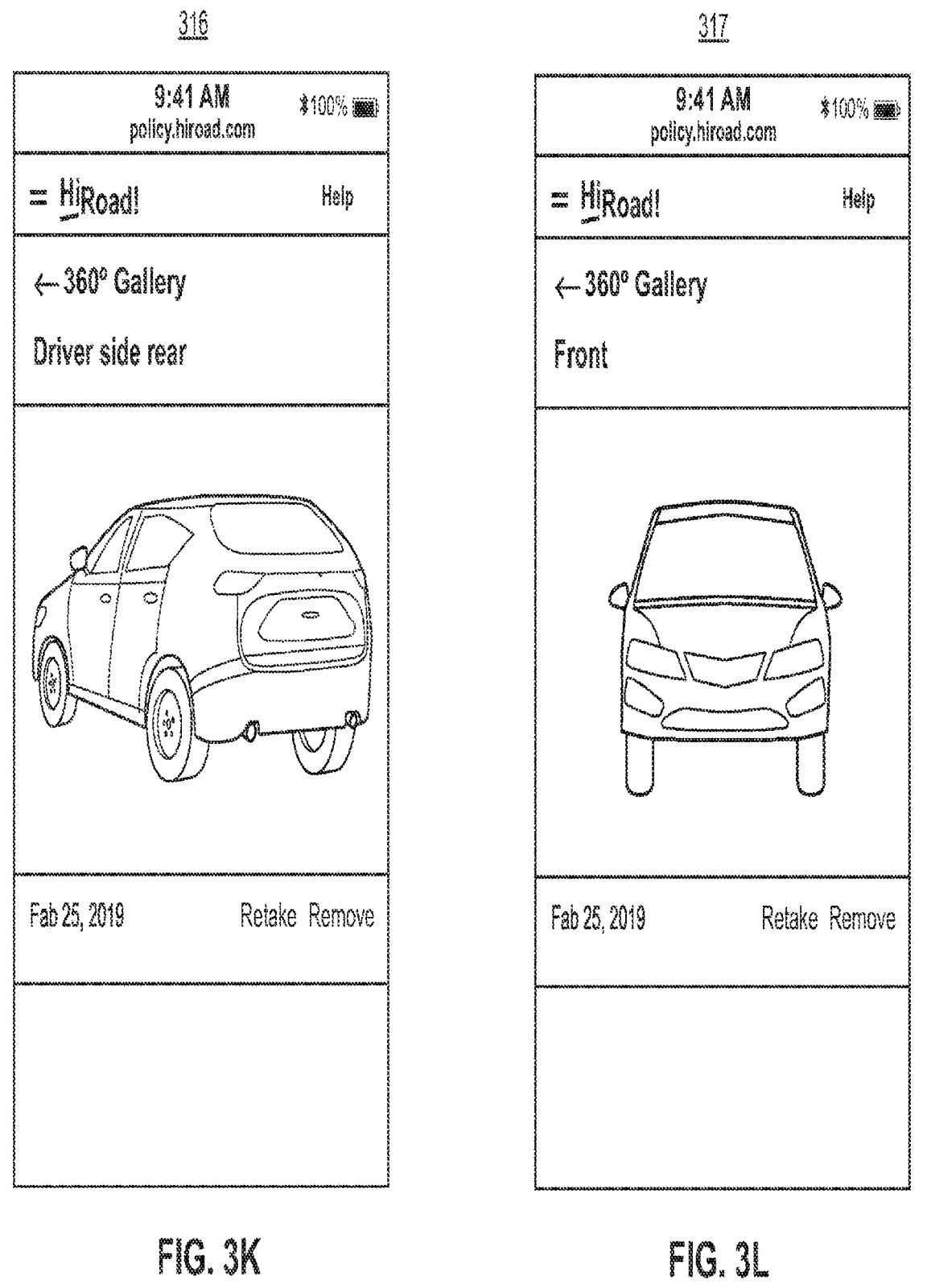

9:41 AM        ⚡100% 🔋
policy.hiroad.com

☰ HiRoad!                    Help

← 360° Gallery

Driver side rear

Fab 25, 2019        Retake  Remove

9:41 AM        ⚡100% 🔋
policy.hiroad.com

☰ HiRoad!                    Help

← 360° Gallery

Front

Fab 25, 2019        Retake  Remove

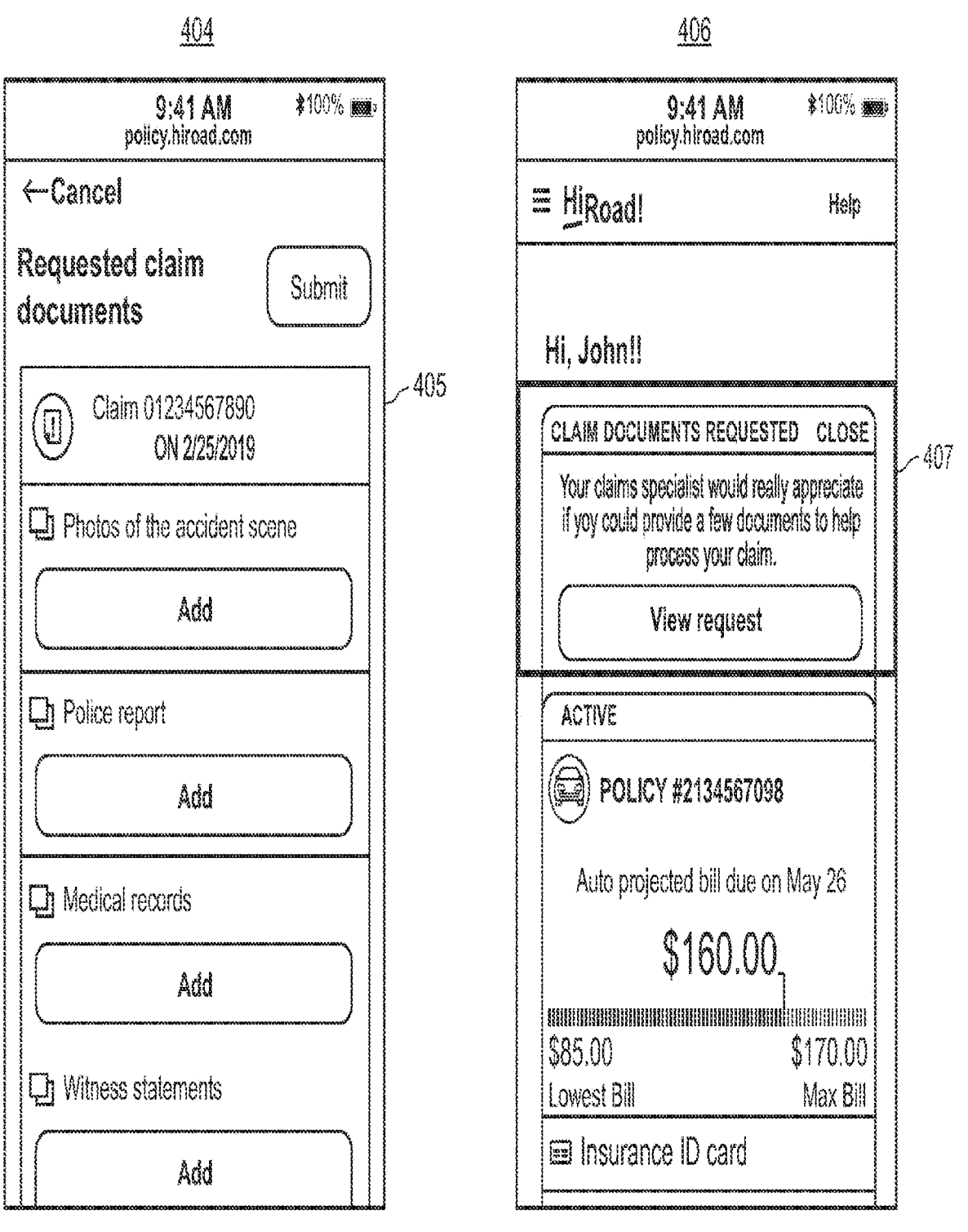
FIG. 4C                                    FIG. 4D

413

414

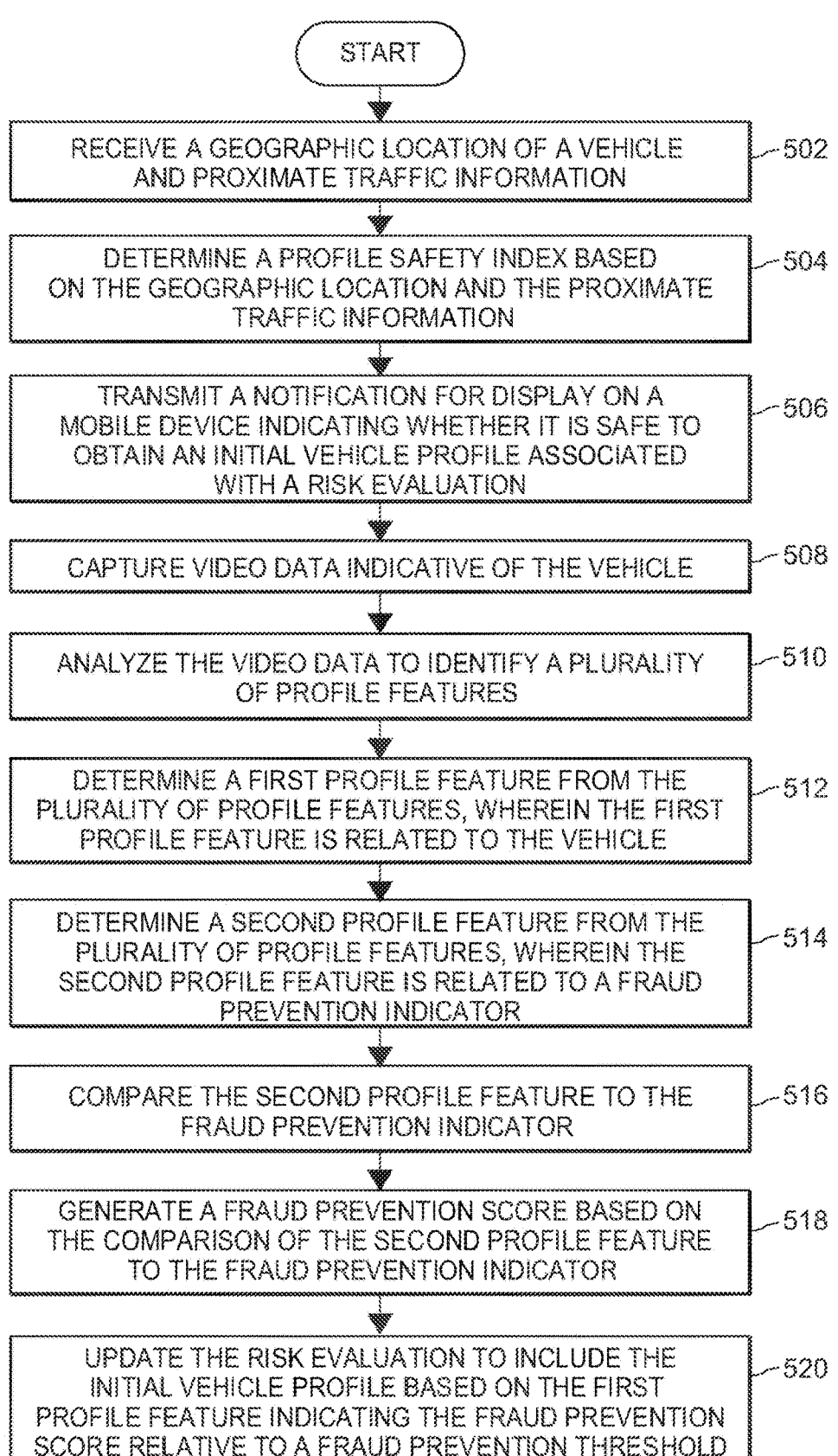

START

RECEIVE A GEOGRAPHIC LOCATION OF A VEHICLE AND PROXIMATE TRAFFIC INFORMATION — 502

DETERMINE A PROFILE SAFETY INDEX BASED ON THE GEOGRAPHIC LOCATION AND THE PROXIMATE TRAFFIC INFORMATION — 504

TRANSMIT A NOTIFICATION FOR DISPLAY ON A MOBILE DEVICE INDICATING WHETHER IT IS SAFE TO OBTAIN AN INITIAL VEHICLE PROFILE ASSOCIATED WITH A RISK EVALUATION — 506

CAPTURE VIDEO DATA INDICATIVE OF THE VEHICLE — 508

ANALYZE THE VIDEO DATA TO IDENTIFY A PLURALITY OF PROFILE FEATURES — 510

DETERMINE A FIRST PROFILE FEATURE FROM THE PLURALITY OF PROFILE FEATURES, WHEREIN THE FIRST PROFILE FEATURE IS RELATED TO THE VEHICLE — 512

DETERMINE A SECOND PROFILE FEATURE FROM THE PLURALITY OF PROFILE FEATURES, WHEREIN THE SECOND PROFILE FEATURE IS RELATED TO A FRAUD PREVENTION INDICATOR — 514

COMPARE THE SECOND PROFILE FEATURE TO THE FRAUD PREVENTION INDICATOR — 516

GENERATE A FRAUD PREVENTION SCORE BASED ON THE COMPARISON OF THE SECOND PROFILE FEATURE TO THE FRAUD PREVENTION INDICATOR — 518

UPDATE THE RISK EVALUATION TO INCLUDE THE INITIAL VEHICLE PROFILE BASED ON THE FIRST PROFILE FEATURE INDICATING THE FRAUD PREVENTION SCORE RELATIVE TO A FRAUD PREVENTION THRESHOLD — 520

FIG. 5

SYSTEMS AND METHODS FOR FRAUD PREVENTION BASED ON VIDEO ANALYTICS

CROSS-REFERENCES TO RELATED APPLICATIONS

This patent application is a continuation of U.S. patent application Ser. No. 18/212,730, filed Jun. 22, 2023, which is a continuation of U.S. patent application Ser. No. 17/853, 817, filed Jun. 29, 2022, U.S. Pat. No. 11,735,043, which is a continuation of U.S. patent application Ser. No. 16/667, 762, filed Oct. 29, 2019, U.S. Pat. No. 11,417,208, the entire disclosures of which are incorporated by reference herein for all purposes.

FIELD OF THE DISCLOSURE

The present disclosure generally relates to video analytics based image verification and, more particularly, to a system and method for obtaining an initial vehicle profile based on video data indicative of a vehicle by comparing a profile feature included in the video data to an image verification indicator.

BACKGROUND

As a general principle of risk evaluation, high-fidelity data describing the evaluated individual or item is of the utmost importance. Thanks to advances in technology, specifically in the field of mobile technology, such high-fidelity data may be gathered locally by a mobile device user. However, the type of data that can be gathered is limited and vulnerable to modification, and local data gathering enables submissions that were not traditionally possible.

Conventional techniques in risk evaluation through local data gathering involve a user capturing still images of an item of interest for submission. Many conventional techniques utilize a mobile device's integrated camera to capture still images that are submitted through a third-party application to facilitate an interaction with the third-party. However, such conventional techniques suffer from a variety of potential submission issues, can place users in potentially dangerous situations when capturing the still images, and result in low overall customer satisfaction levels through inefficient customer service based on an evaluating entity's inability to accurately verify submissions.

Notably, and due to the relative simplicity associated with altering still images, many submissions feature altered or modified still images, or still images that represent another item entirely. Moreover, such conventional techniques suffer from an inability to identify who is submitting the still images because no in-person interaction takes place, and thus permit submissions from unrelated persons accessing a registered user's account and/or policy. Finally, such conventional techniques place users in exterior positions relative to the item of interest without any indication of external factors that might impact their efforts to capture the still images. All of these pitfalls associated with conventional techniques erode customer confidence and negatively impact an evaluating entity's ability to provide high levels of customer service.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a video analytics based image verification system for obtaining initial vehicle profiles may be provided. The video analytics based image verification system may include an external processing server configured to receive a geographic location of a vehicle and proximate traffic information; determine a profile safety index based on the geographic location and the proximate traffic information; transmit a notification for display on a mobile device indicating whether it is safe for a user to obtain an initial vehicle profile associated with a risk evaluation; receive video data indicative of the vehicle from the mobile device; analyze the video data to identify a plurality of profile features; determine a first profile feature from the plurality of profile features, wherein the first profile feature is related to the vehicle; determine a second profile feature from the plurality of profile features, wherein the second profile feature is related to an image verification indicator; determine a comparison of the second profile feature to the image verification indicator; and generate an image verification score based on the comparison of the second profile feature to the image verification indicator. The video analytics based image verification system may further include a provider server configured to receive the first profile feature and the image verification score from the external processing server; and update the risk evaluation to include the initial vehicle profile based on the first profile feature indicating the image verification score relative to an image verification threshold.

In another embodiment, a video analytics based image verification method for obtaining initial vehicle profiles may be provided. The video analytics based image verification method may include receiving, by an external processing server, a geographic location of a vehicle and proximate traffic information; determining, by the external processing server, a profile safety index based on the geographic location and the proximate traffic information; transmitting, by the external processing server, a notification for display on a mobile device indicating whether it is safe for a user to obtain an initial vehicle profile associated with a risk evaluation; capturing, by the mobile device, video data indicative of the vehicle; analyzing, by the external processing server, the video data to identify a plurality of profile features; determining, by the external processing server, a first profile feature from the plurality of profile features, wherein the first profile feature is related to the vehicle; determining, by the external processing server, a second profile feature from the plurality of profile features, wherein the second profile feature is related to an image verification indicator; determining, by the external processing server, a comparison of the second profile feature to the image verification indicator; generating, by the external processing server, an image verification score based on the comparison of the second profile feature to the image verification indicator; and updating, by a provider server, the risk evaluation to include the initial vehicle profile based on the first profile feature indicating the image verification score relative to an image verification threshold.

In yet another embodiment, a computer readable storage medium comprising non-transitory computer readable instructions stored thereon for obtaining initial vehicle profiles with image verification analytics may be provided. The instructions, when executed on one or more processors, may cause the one or more processors to receive a geographic location of a vehicle and proximate traffic information;

determine a profile safety index based on the geographic location and the proximate traffic information; transmit a notification for display on a mobile device indicating whether it is safe for a user to obtain an initial vehicle profile associated with a risk evaluation; receive video data indicative of the vehicle; analyze the video data to identify a plurality of profile features; determine a first profile feature from the plurality of profile features, wherein the first profile feature is related to the vehicle; determine a second profile feature from the plurality of profile features, wherein the second profile feature is related to an image verification indicator; determine a comparison of the second profile feature to the image verification indicator; generate an image verification score based on the comparison of the second profile feature to the image verification indicator; and update the risk evaluation to include the initial vehicle profile based on the first profile feature indicating the image verification score relative to an image verification threshold.

In yet another embodiment, a computer-implemented method for image analysis may be provided. The computer-implemented method comprising: receiving at least one image related to an evaluation, wherein the at least one image includes at least one of video data or still image data; analyzing the at least one image to extract profile features using one or more of a pattern recognition algorithm, a facial recognition algorithm, an object recognition (OR), or an object character recognition (OCR), wherein the profile features, as extracted, include first profile features that relate to a vehicle and second profile features that relate to an image verification indicator, and wherein the second profile features include one or more features related to an identity of a user of the vehicle; generating an image verification score at least partially based on a first comparison of at least a portion of one or more of the first profile features and the image verification indicator, and a second comparison of at least a portion of one or more of the second profile features and the image verification indicator; and updating a vehicle profile for the vehicle when the image verification score satisfies a predetermined threshold of similarity based on the first comparison and the second comparison.

In yet another embodiment, a computing system for image analysis may be provided. The computing system comprising: one or more processors; and a memory storing instructions that, upon execution by the one or more processors, cause the computing system to perform one or more processes including a method, the method comprising: receiving at least one image related to an evaluation, wherein the at least one image includes at least one of video data or still image data; analyzing the at least one image to extract profile features using one or more of a pattern recognition algorithm, a facial recognition algorithm, an object recognition (OR), or an object character recognition (OCR), wherein the profile features, as extracted, include first profile features that relate to a vehicle and second profile features that relate to an image verification indicator, and wherein the second profile features include one or more features related to an identity of a user of the vehicle; generating an image verification score at least partially based on a first comparison of at least a portion of one or more of the first profile features and the image verification indicator, and a second comparison of at least a portion of one or more of the second profile features and the image verification indicator; and updating a vehicle profile for the vehicle when the image verification score satisfies a predetermined threshold of similarity based on the first comparison and the second comparison.

In yet another embodiment, a non-transitory computer-readable medium storing instructions for image analysis may be provided. The instructions upon execution by one or more processors of a computing system, cause the computing system to perform one or more processes including a method, the method comprising: receiving at least one image related to an evaluation, wherein the at least one image includes at least one of video data or still image data; analyzing the at least one image to extract profile features using one or more of a pattern recognition algorithm, a facial recognition algorithm, an object recognition (OR), or an object character recognition (OCR), wherein the profile features, as extracted, include first profile features that relate to a vehicle and second profile features that relate to an image verification indicator, and wherein the second profile features include one or more features related to an identity of a user of the vehicle; generating an image verification score at least partially based on a first comparison of at least a portion of one or more of the first profile features and the image verification indicator, and a second comparison of at least a portion of one or more of the second profile features and the image verification indicator; and updating a vehicle profile for the vehicle when the image verification score satisfies a predetermined threshold of similarity based on the first comparison and the second comparison.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIGS. 4A-J depict a second set of example GUIs for an operational embodiment of, for example, the system of FIG. 2;

FIG. 5 is a flowchart depicting an example method corresponding to various embodiments of the present disclosure.

The figures depict various aspects of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

Figure 1:
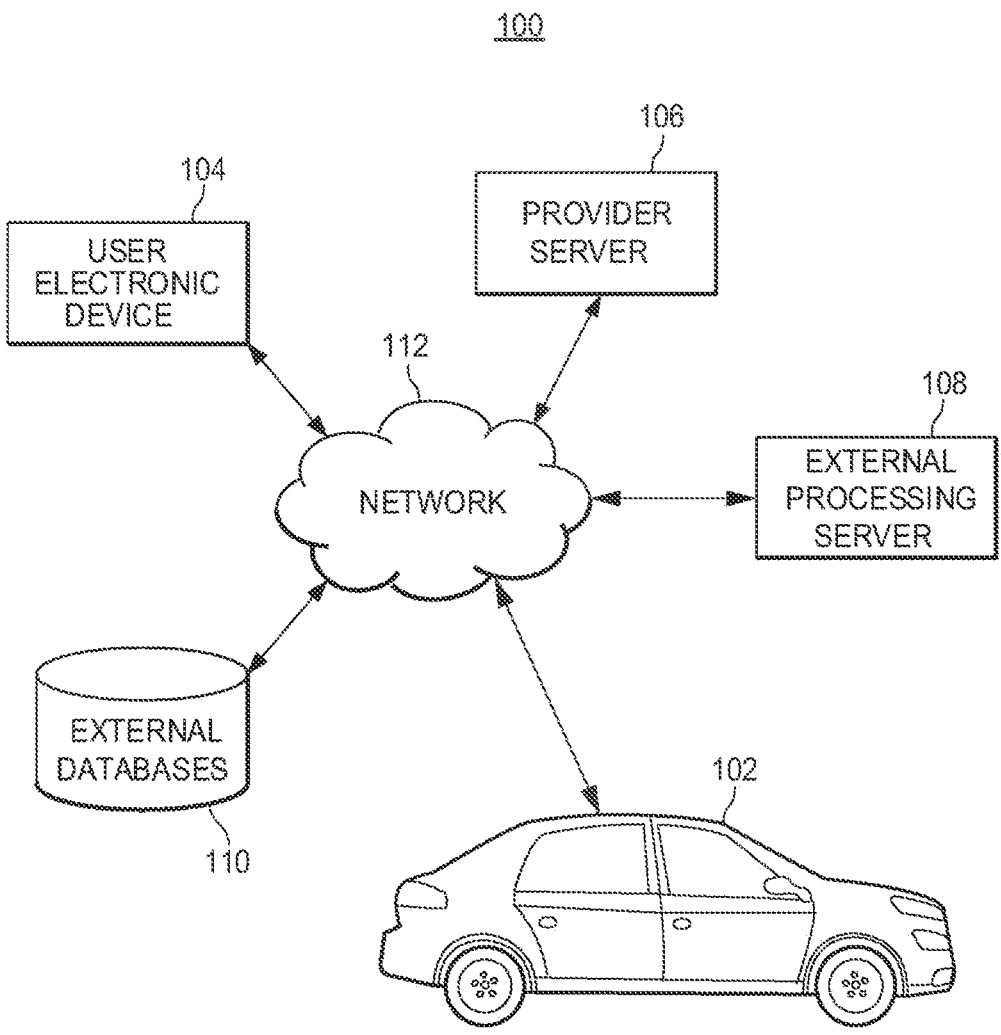
FIG. 1 illustrates an example system for obtaining an initial vehicle profile with image verification analytics.

I. Example Systems and Related Functionality for Obtaining an Initial Vehicle Profile With Image Verification Analytics FIG. 1 illustrates an example system 100 for obtaining an initial vehicle profile with image verification analytics. The example system 100 may include a vehicle 102, a user electronic device 104, an provider server 106, an external processing server 108, external databases 110, and a network 112. While illustrated in FIG. 1 as a single external database, in some embodiments the external databases 110 includes two or more external databases. The network 110 may be a computer network of an insurance provider (e.g., provided or used by the insurance provider or communications over which the insurance provider otherwise controls or facilitates).

Figure 2:
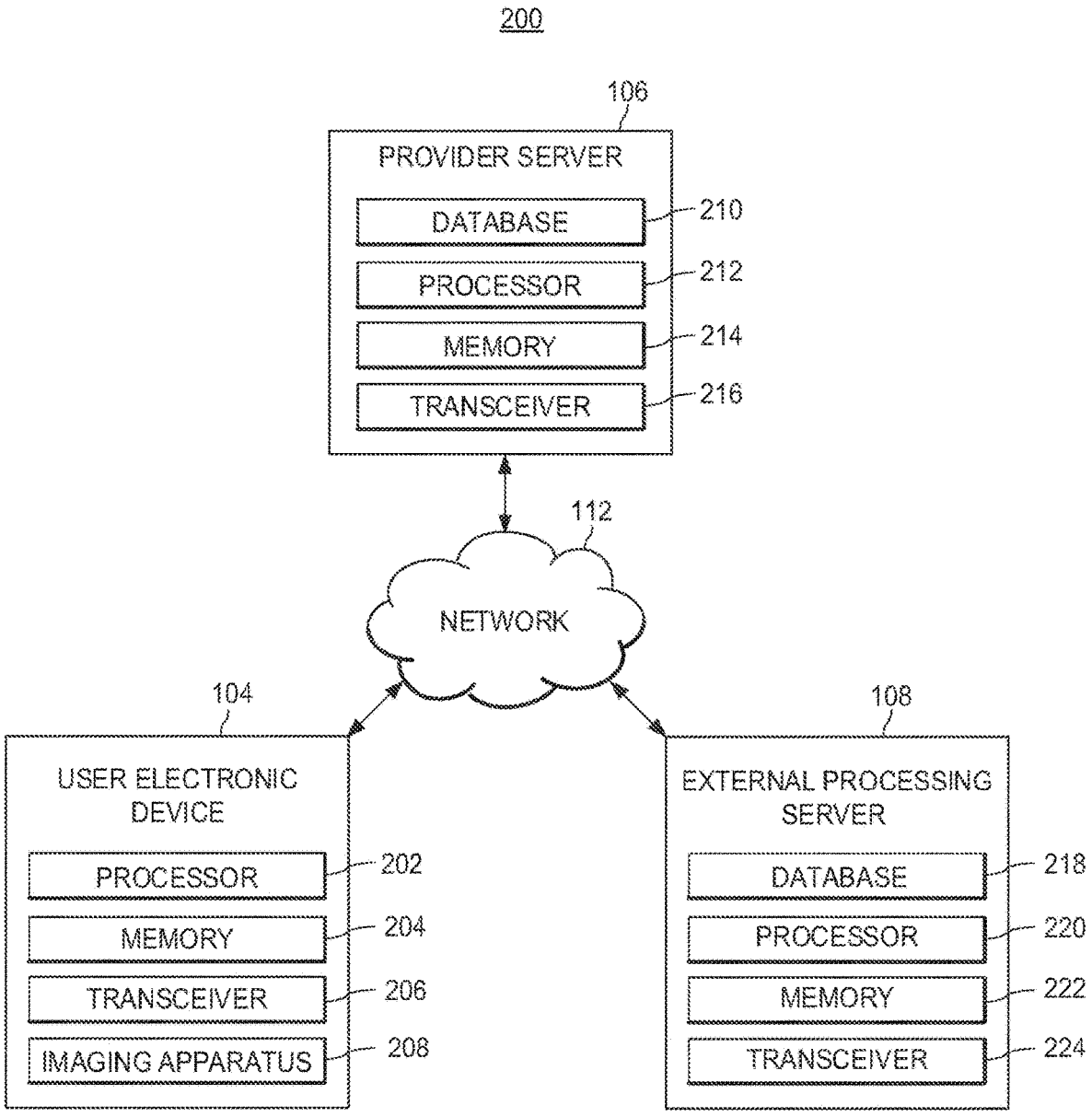
FIG. 2 illustrates another example system for obtaining an initial vehicle profile with image verification analytics.

In reference to the example system 200 of FIG. 2, the user electronic device 104 may include a processor 202, a memory 204, a transceiver 206, and an imaging apparatus 208. While referred to herein as a "processor" and a "memory," in some embodiments the processor 202 includes two or more processors and the memory 204 includes two or more memories. The processor 202 may be configured to process both still image data and video data (e.g., video data captured by user electronic device 104) and analyze aspects of the still image data and/or video data. The memory 204 may store computer-executable instructions, which may be executed by the processor 202.

The imaging apparatus 208 may include, for example, a camera and/or a video camera. As such, the imaging apparatus 208 may be configured to capture one or both of still images and video footage. However, it should be understood that the imaging apparatus 208 is not limited to the cameras disclosed herein. Additionally, the user electronic device 104 may be configured to receive communications from the provider server 106 and/or the external processing server 108 in response to transmitting captured data and/or before, during, or after obtaining an initial vehicle profile.

In various embodiments, the user electronic device 104 may execute computer-executable instructions, such as a mobile application, that allow the actions described herein to be implemented. For example, if the user electronic device 104 is a smartphone, the user may capture data with the imaging apparatus 208 to transmit through the network 112 to the provider server 106 and/or the external processing server 108 for processing. The user electronic device 104, and each of the computing devices referred to herein, may be any suitable computing device such as, but not limited to, a desktop computer, a laptop computer, a mobile phone such as a smart phone, a tablet, a phablet, smart glasses, other wearable computing device(s), etc.

The provider server 106 may include a database 210, a processor 212, a memory 214, and a transceiver 216. While referred to herein as a "processor" and a "memory," in some embodiments the processor 212 includes two or more processors and the memory 214 includes two or more memories. The processor 212 may be configured to process both still image data and video data (e.g., video data captured by user electronic device 104) and analyze aspects of the still image data and/or video data. The memory 214 may store computer-executable instructions, which may be executed by the processor 212. The database 210 may include a plurality of risk evaluations. The plurality of risk evaluations may correspond to a plurality of insured user profiles/accounts, insurance policies, or other user profiles, accounts, policies, etc.

Further, the plurality of risk evaluations may include relevant data associated with a user or item indicated in the risk evaluation. For example, if one of the plurality of risk evaluations is an insurance policy listing a first user as the insured, the insurance policy may list the first user's name, age, gender, etc. Moreover, and as discussed further herein, the relevant data may include multiple profile features associated with each risk evaluation. These profile features may, for example, facilitate image verification by allowing the provider server 106 to authenticate any attempts to access and/or modify details associated with the corresponding risk evaluation. Correspondingly, the provider, via the provider server 106, may more accurately and efficiently verify and pay claims, resulting in more satisfied customers.

The external processing server 108 may include a database 218, a processor 220, a memory 222, and a transceiver 224. While referred to herein as a "processor" and a "memory," in some embodiments the processor 220 includes two or more processors and the memory 222 includes two or more memories. The processor 220 may be configured to process both still image data and video data (e.g., video data captured by user electronic device 104) and analyze aspects of the still image data and/or video data. The memory 222 may store computer-executable instructions, which may be executed by the processor 220.

The external processing server 108 may be connected to both the user electronic device 104 and the provider server 106 via the network 112, such that each device (104, 106, and 108) may communicate to every other device via their respective transceivers (206, 216, 224). For example, the external processing server 108 may receive profile features from the provider server 106. The external processing server 108 may store these received profile features in the database 218 and/or the memory 222. Thus, and as discussed further herein, either the provider server 106 or the external processing server 108 may be configured to process, analyze, or otherwise interpret data captured by the user electronic device 104.

In embodiments where, as noted above and as further discussed below, video image data is provided to an insurance provider, the insurance provider may receive this indication at the provider server 106. The provider server 106, in embodiments, may also make available for download (e.g., via the network 112) the application executed by the user electronic device 104 to implement functionality described herein. It will be appreciated that one or both of the provider server 106 or the external processing server 108 may be a server provided by or used by the insurance provider, or use of which the insurance provider otherwise controls or facilitates.

In embodiments, the network 112 may be or may include a network such as the Internet and/or any other type of suitable network (e.g., a local area network (LAN), a metropolitan area network (MAN), a wide area network (WAN), a mobile network, a wired or wireless network, a private network, a virtual private network, etc.). The network 112 may also or alternatively be or include one or more cellular networks such as code division multiple access (CDMA) network, GSM (Global System for Mobile Communications) network, WiMAX (Worldwide Interoperability for Microwave Access) network, Long Term Evolution (LTE) network, etc.

As further described below, the example systems (100, 200) facilitate obtaining an initial vehicle profile with image verification analytics, and allow, among other advantages, secure vehicle identification through the use of video image data, and a robust image verification analysis through profile features captured within the video image data. Video image data is more difficult to manipulate and/or alter than still image data. Thus, a submitted initial vehicle profile that contains video image data is more reliable based on the secure characteristics of the video image data. Simultaneously, profile features incorporated in the video image data benefit from the same difficulty to falsify, and add a layer of integrity to the submitted initial vehicle profile. Specifically, the incorporated profile features provide a form of objective data the system (e.g., 100, 200) may verify against known, authenticating information to ensure the submitted initial vehicle profile originated from a known source. Such profile features featuring authenticating information may satisfy state regulations requiring, for example, initial vehicle inspections prior to the issuance of vehicle insurance and/or claims processing. In any event, the authentication features of the example systems (100, 200) facilitate an evaluating entity (e.g., insurance company, mechanic, medical underwriter) verifying and/or paying claims more accurately and efficiently, resulting in a higher level of overall customer service and satisfaction. This increased efficiency and accuracy can yield further benefits to customers in the form of risk evaluation benefits/incentives (e.g., lower insurance rates, premiums, deductibles, overall cost, etc.), which further increases customer satisfaction.

II. Example Operational Embodiments of the Systems

FIGS. 3A-R and 4A-J depict example interfaces associated with the systems and methods. In embodiments, the interfaces may be displayed by a computing device in a user interface, such as the user electronic device 104 as discussed with respect to FIGS. 1 and 2. Additionally, the interfaces may be accessed and reviewed by a user of an application or platform, where the user may make selections, submit entries or modifications, or facilitate other functionalities.

FIG. 3A depicts an interface 300 associated with the systems and method described herein. In particular, the interface 300 depicts an example notification a user may receive when initially attempting to participate in a risk evaluation procedure by obtaining an initial vehicle profile. For example, a user may initiate contact with an evaluating entity (e.g., an insurance provider, a mechanic, etc.) and said entity may provide the notification depicted in the interface 300.

In embodiments, the evaluating entity may use the notification to verify a set of contact information associated with the user. For example the user may verify their contact information, and prompt the evaluating entity to enable the user to obtain an initial vehicle profile. The user's verification may be transmitted from the user's device (e.g., user electronic device 104) to the evaluating entity's device (e.g., provider server 106) for further processing. Once processed, and as depicted in FIG. 3B, the evaluating entity's device may send the user a responsive notification (depicted in interface 301) confirming the user's verification. Additionally, the system (100, 200) may request that the user obtain the initial vehicle profile at this point, or at any other suitable time.

Figures 3C, 3D:
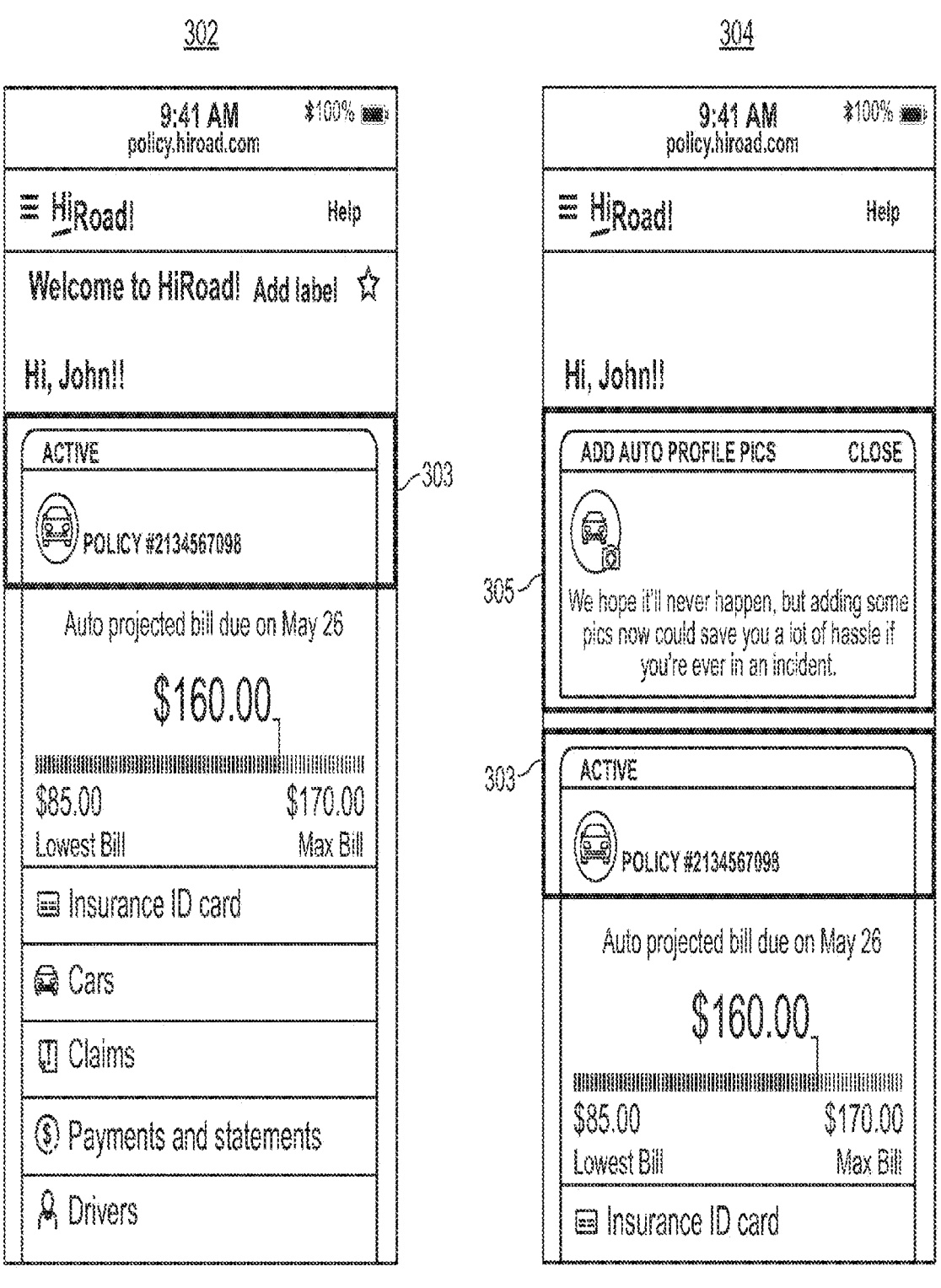
FIGS. 3A-3R depict a first set of example GUIs for an operational embodiment of, for example, the system of FIG. 2.

In embodiments, a user may have an established vehicle account with an evaluating entity. For example, the evaluating entity's server (e.g., provider server 106) may contain information relating to the user's vehicle in the evaluating entity's database (e.g., database 210). In this circumstance, it is possible that a user may not have obtained an initial vehicle profile to incorporate into their vehicle account. Thus, and as illustrated in FIG. 3C, if a user logs into their vehicle account, the provider server 106 may provide an interface similar to interface 302 for the user to inspect. The interface 302 may include an identification area 303 that may include information such as policy number, account status, vehicle picture, etc. Additionally, the interface 302 may feature other relevant account information such as projected bill amounts, bill due dates, and various options for the user to select. However, if the user has not obtained an initial vehicle profile, the identification area 303 will not include a vehicle photo.

Thus, as depicted in the interface 304 of FIG. 3D, the evaluating entity's server 106 may transmit a profile picture notification 305 for display on the interface 304. The user may select the profile picture notification 305 to initiate and/or enable several of the functionalities described herein. Selecting the profile picture notification 305 may transition the user to interface 306, depicted in FIG. 3E. The interface 306 may enable a user to view all vehicles included in a particular risk evaluation procedure (e.g., an insurance policy, a mechanic service history, etc.).

For example, the interface 306 may display all car insurance policies associated with a particular user profile. The interface 306 may include an individual vehicle profile 307 for each covered vehicle. The individual vehicle profile 307 may contain information indicating the insurance policy number, the vehicle year, make, model, color, VIN, and a vehicle photo. If a user has not obtained an initial vehicle profile, the vehicle photo field of the individual vehicle profile 307 will be left empty. Thus, if a user selects the individual vehicle profile 307 depicted in FIG. 3E, the instructions executed on the processor (e.g., processor 202) may transition the application from interface 306 to interface 308, depicted in FIG. 3F.

The interface 308 includes an expanded individual vehicle profile 309 and a photo capture selection area 310. The expanded individual vehicle profile 309 may include similar information as the individual vehicle profile 307, and may include additional information associated with the vehicle and/or the corresponding vehicle policy (or, for example, a maintenance history). For example, the expanded individual vehicle profile 309 may include a policy issuance date, a policy term, a vehicle registration state, current inspection records for the vehicle, etc.

The photo capture selection area 310 may be a user-selectable option enabling certain features of the embodiments described herein. For example, a user may select the photo capture selection area 310, and the user's device (e.g., user electronic device 104) may transition from displaying interface 308 to displaying interface 311, as depicted in FIG.

3G. At this point, and as discussed further herein, the user's device 104 may analyze the user's current geotagged location and proximate traffic information to determine whether it is safe for the user to obtain the initial vehicle profile.

Once the user's device 104 determines that an initial vehicle profile can be safely obtained, the device 104 may display interface 311. The interface 311 may represent a field of view (FOV) of a camera (e.g., imaging apparatus 208). In other words, once a user selects the photo capture selection area 310, the user's device 104 may access the imaging apparatus 208 in order to capture images associated with a vehicle indicated in the expanded individual vehicle profile 309. The interface 311 may also include a user identification area 312 featuring an image or other representation of the user. The user identification area 312 may capture an image of the user that the system (e.g., external processing server 108) may use to positively verify the user's identity upon submission of the captured images.

Figures 3G, 3H:
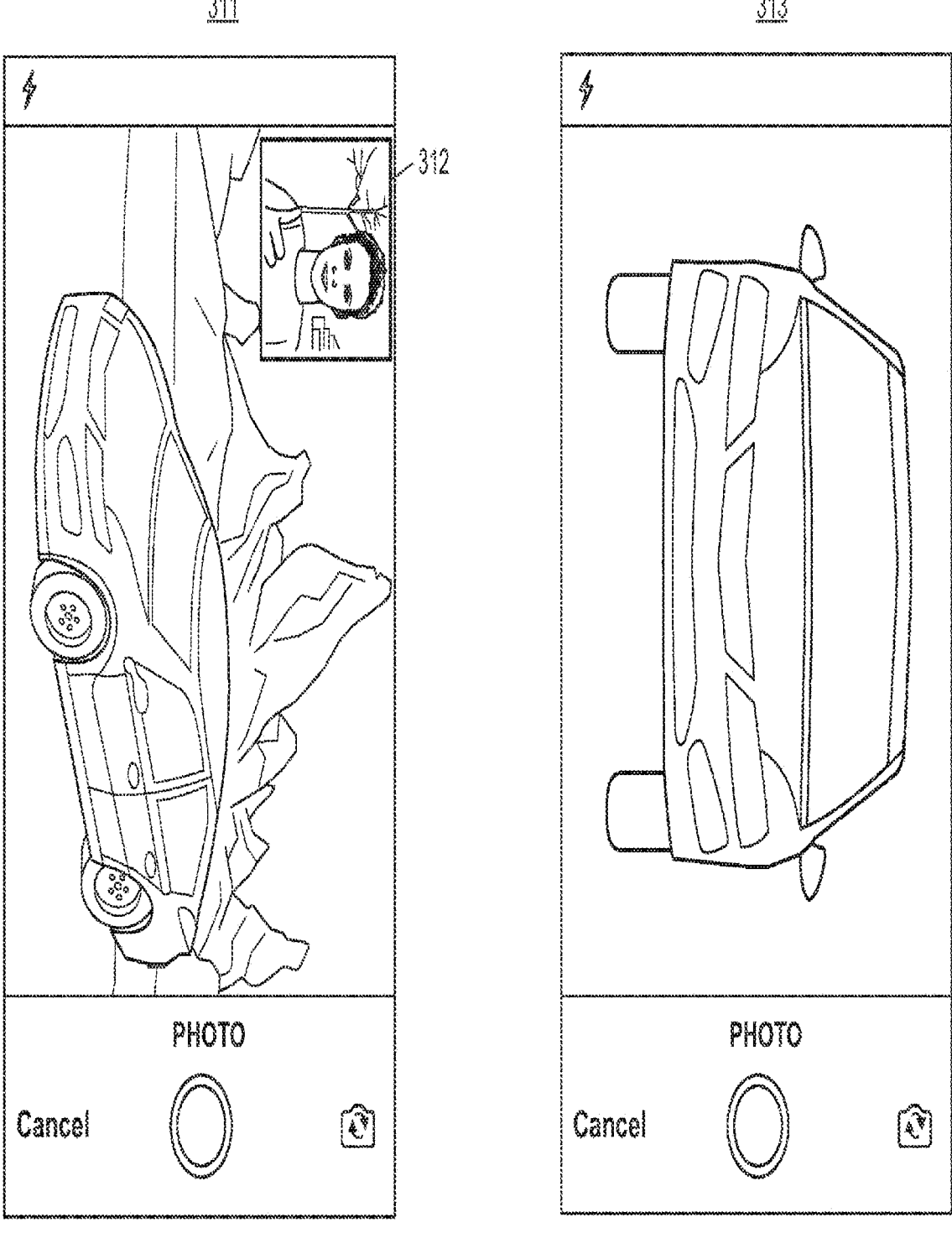
Figures 3M, 3N:
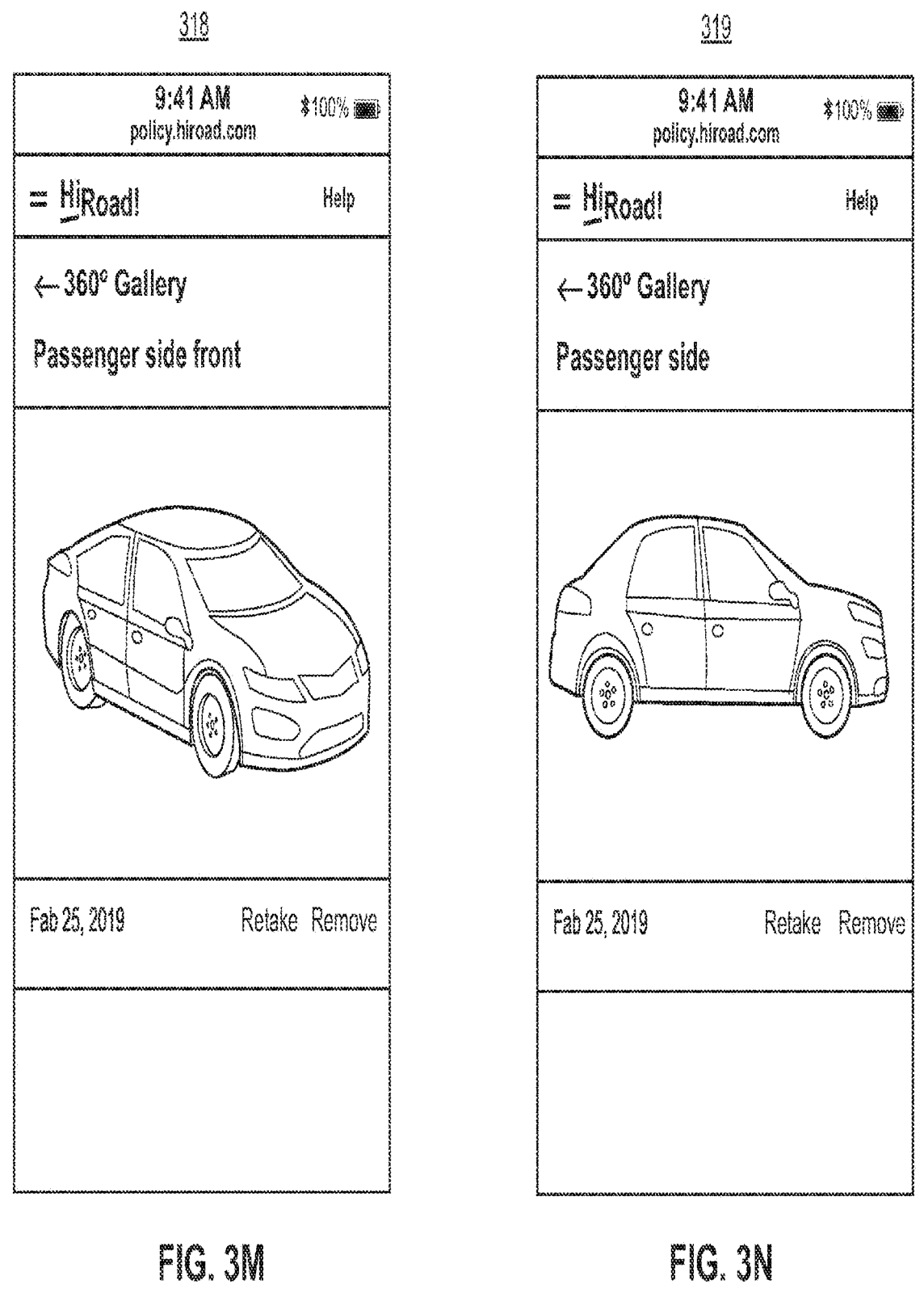
Figure 3O:
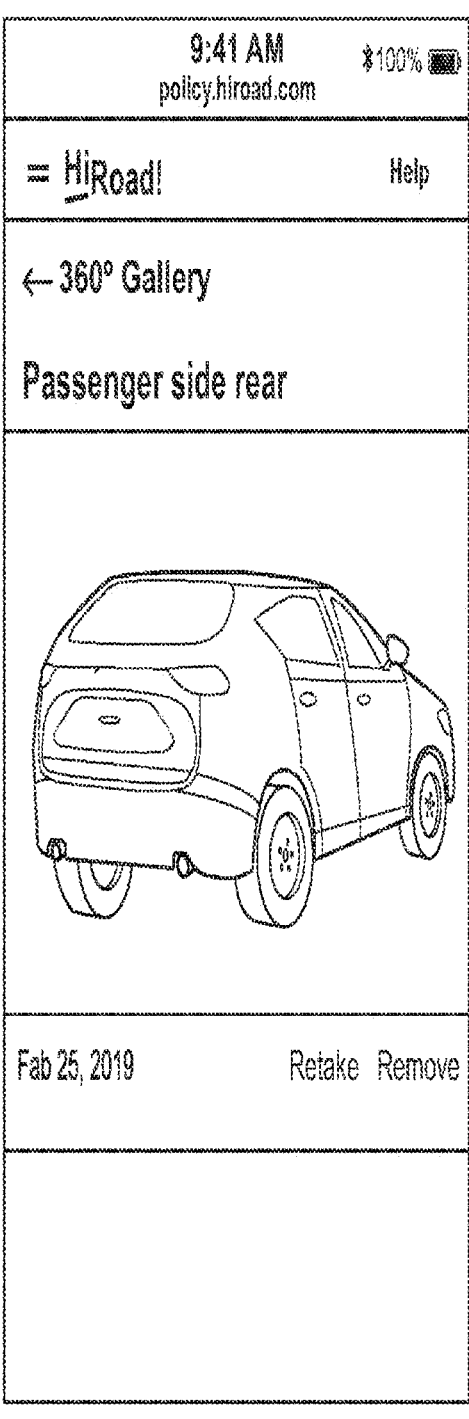
Figure 3P:
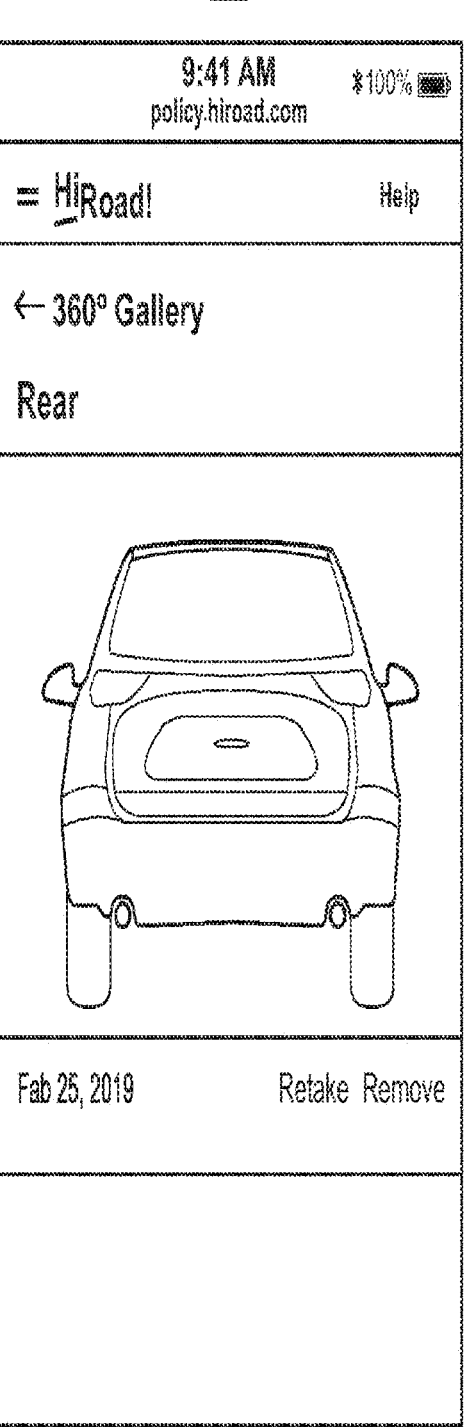

To obtain an initial vehicle profile, the user may be required to obtain images featuring various perspectives of the vehicle. Thus, as depicted in interface 313 of FIG. 3H, the system (100, 200) may require the user to capture an image of the front of a vehicle. Similarly, as depicted in FIGS. 3I-3P, the system (100, 200) may require the user to obtain images featuring the driver side (interface 314), driver side front (interface 315), driver side rear (interface 316), front (interface 317), passenger side front (interface 318), passenger side (interface 319), passenger side rear (interface 320), and/or rear (interface 321) of the vehicle. It should be understood that the system (100, 200) may require any capturing combination of these images in any order to obtain an initial vehicle profile.

Moreover, it is to be understood that the "images" referenced and depicted in FIGS. 3H-3P may be extracted by the system (100, 200) from a single, continuous stream of video data. To illustrate, the system (100, 200) may prompt a user to capture the images referenced in FIGS. 3H-3P by accessing and activating the video camera (e.g., imaging apparatus 208) of the user's device (e.g., user electronic device 104). The user would then conduct the vehicle walkaround by taking a continuous video of the vehicle from various perspectives (e.g., as represented by interfaces 313-321). Additionally, and as described further herein, the system (100, 200) may require the user to provide an identifying image at some point during the vehicle walkaround to authenticate the video data. Thus, after the user has completed the vehicle walkaround and while the video camera 208 remains activated, the user may take video images of their face or other identifying features, as displayed in the user identification area 312.

Consequently, while obtaining these various images, a user may place themselves in hazardous exterior conditions. For example, a user may attempt to conduct the vehicle walkaround while on the side of a busy highway, while their vehicle is parked on a busy residential street, or when weather conditions are potentially dangerous (e.g., during a thunderstorm). As mentioned above, and as further discussed herein, the system (100, 200) may notify a user whether the current situation is sufficiently safe to conduct the vehicle walkaround using situational data (e.g., location, traffic, weather, etc.) to generate a profile safety index. In embodiments, the profile safety index is compared to a profile safety index threshold indicative of the minimum allowable safety index for the user to obtain the initial vehicle profile.

Figures 3Q, 3R:
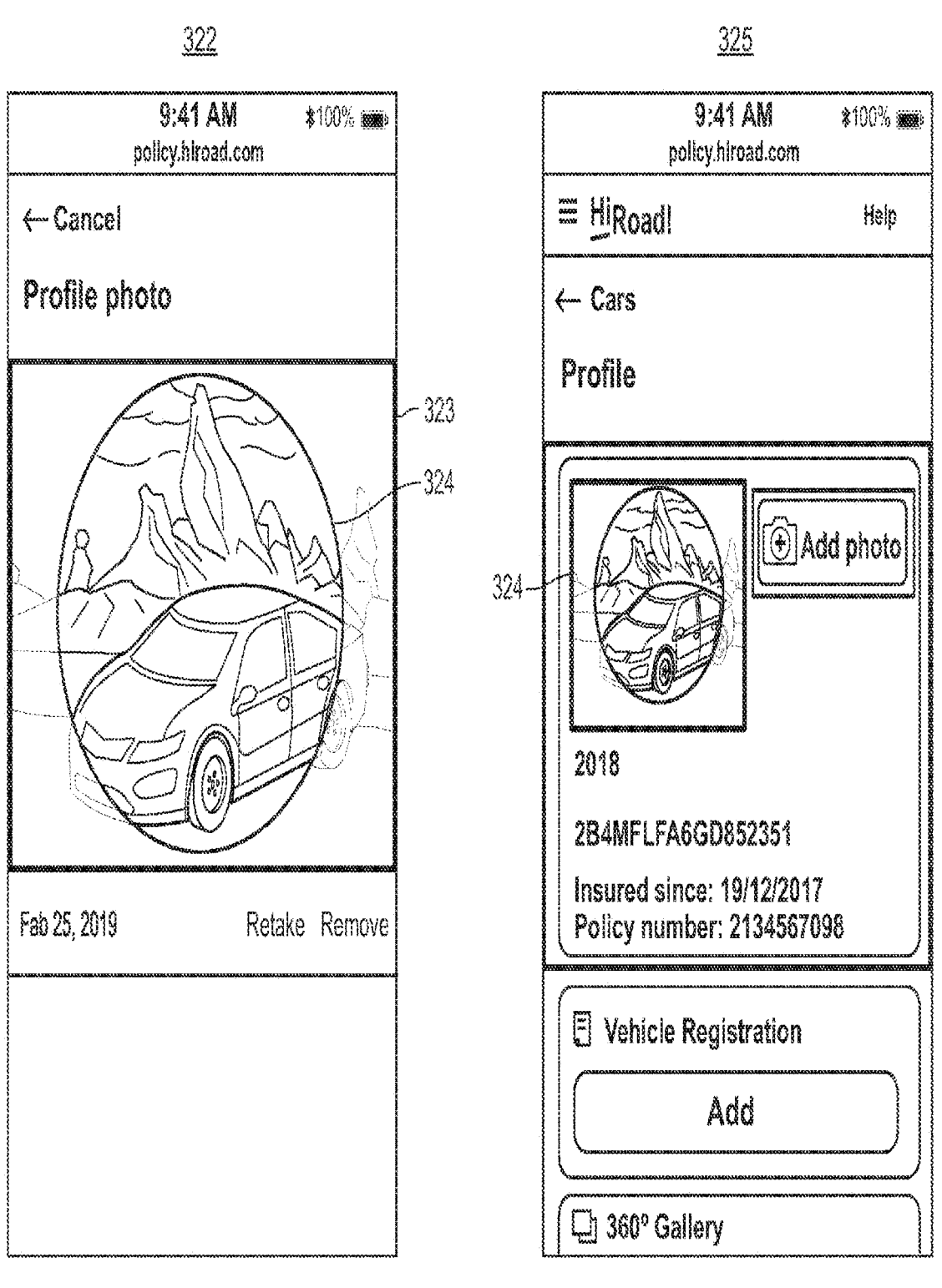

Once the system (100, 200) determines that the images acquired are sufficient, the user's device 104 may transition to interface 322, as depicted in FIG. 3Q. The interface 322 may have a profile photo display area 323 and a profile photo selection area 324. The system (100, 200) may automatically determine which image of the various images captures during the vehicle walkaround is placed in the profile photo display area 323 to be edited by the user, or the user may select a preferred image from the various images captured to serve as the basis for the vehicle's profile photo. The profile photo selection area 324 indicates the portion of the selected photo displayed in the profile photo display area 323 that will be displayed as the vehicle's profile photo. For example, and as depicted in FIG. 3R, the portion of the image indicated by the profile photo selection area 324 is displayed in the interface 325 under the vehicle's profile page.

Figures 4A, 4B:
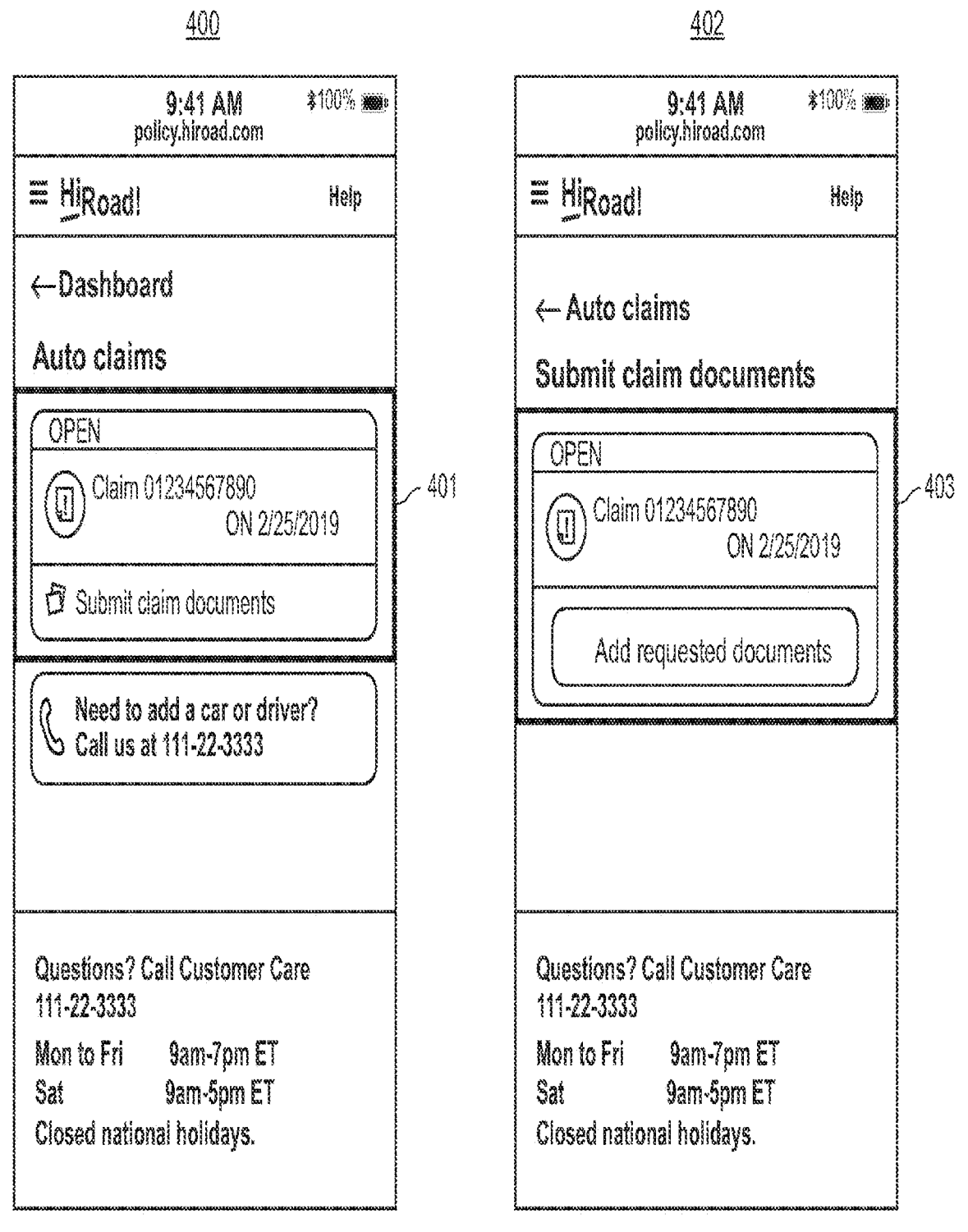

FIG. 4A depicts an interface 400 associated with the systems and method described herein. In particular, the interface 400 depicts an example active claims page an application may present to a user in response to a user's selection. The interface 400 includes an open claims area 401, which may indicate all of the user's open claims related to one vehicle or multiple vehicles. The user may interact with the open claims area 401 by selecting a particular claim, and the user's device may transition from interface 400 to the interface 402, as depicted in FIG. 4B.

The interface 402 may include a claim documents submission area 403. The claim documents submission area 403 may indicate that a user may optionally upload documents via the application to assist in processing the claim. The user may interact with the claim documents request area 403 to prompt the application to transition from interface 402 to interface 404, as depicted in FIG. 4C.

The interface 404 includes a requested claim documents area 405. The requested claim documents area 405 may include a plurality of selectable options for a user. Each selectable option may indicate a specific type of claim information the system (100, 200) may require to adequately process a claim. For example, the requested claim documents area 405 may include selectable options for a user to enter photos of the accident scene, a police report documenting events of an event, medical records corresponding to resulting medical treatment from an event, witness statements of an event, etc. In any event, once submitted, one or both of the provider server 106 and/or the external processing server 108 will store the submitted claim documents into the database (210, 218) for potential use in the method described further herein.

Additionally or alternatively, and as depicted in FIG. 4D, the application may present the interface 406 featuring a claim documents request area 407 to a user when the system (100, 200) receives an update to a user's claim. For example, when the user first submits a claim, the system (100, 200) may recognize that no claim documents are currently accessible in the claims database (e.g., database 210, 218), or simply that no current/updated claim forms are listed in the database (210, 218) for the recently opened claim. In response, one or both of the provider server 106 and/or the external processing server 108 may, via the network 112, transmit a notification to the user electronic device 104 to display the claim documents request area 407. In response to a user interacting with the claim documents request area 407, the application may transition to an interface similar to, for example, interface 404 to facilitate the user submitting relevant claim documents.

Figures 4E, 4F:
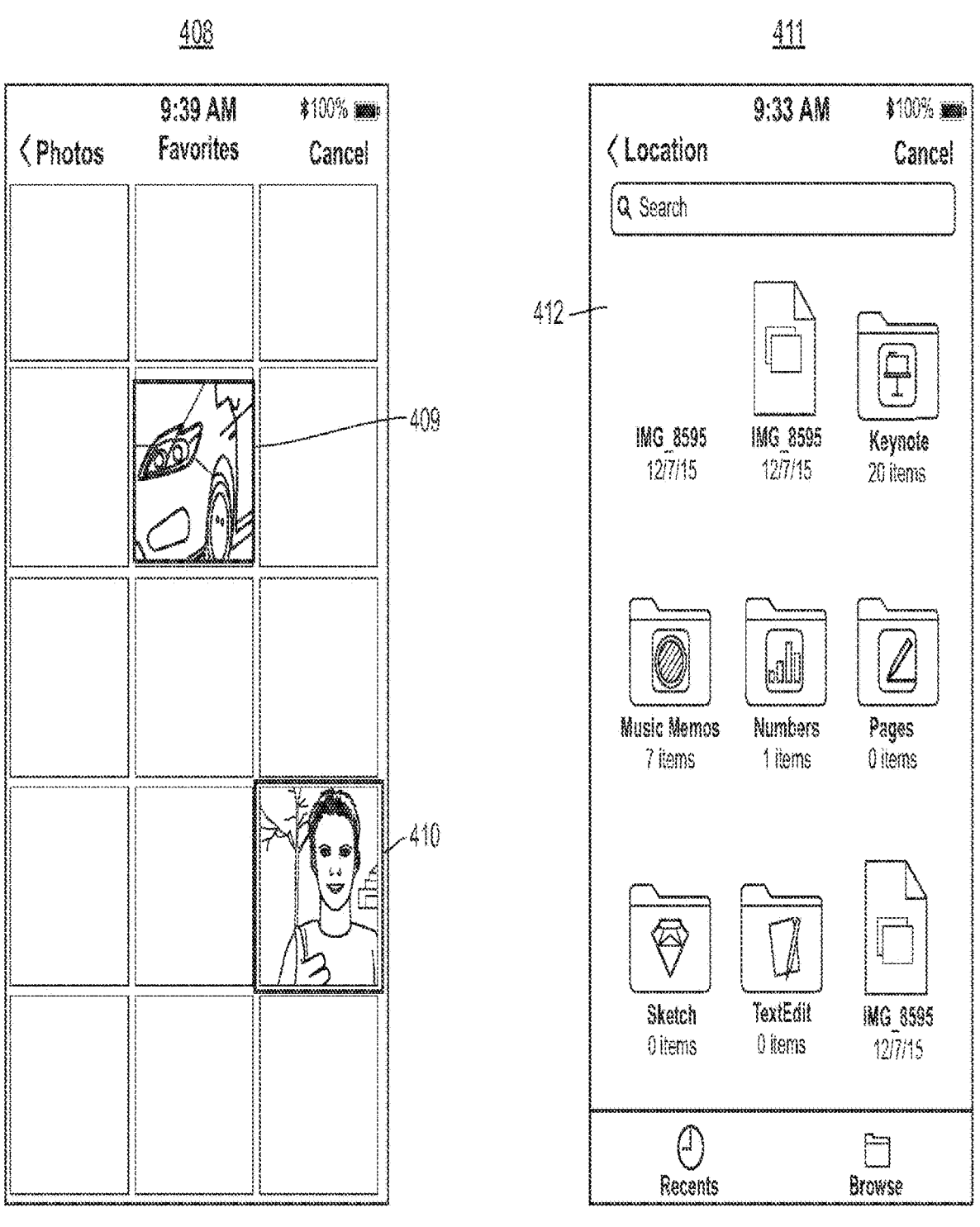

As an example of submitting claim documents, if a user selects an option to provide images of the claim event, the application may transition to interface 408, as depicted in FIG. 4E. Interface 408 includes an image gallery featuring a vehicle image 409 and a user image 410. As further discussed herein, both the vehicle image 409 and the user image 410 may be required by the system (100, 200) to process a claim. The vehicle image 409 may indicate potential damage to the vehicle, and the user image 410 may facilitate an authentication procedure to validate the source of the claim.

Additionally or alternatively, the application may transition to interface 411, as depicted in FIG. 4F. Interface 411 includes a file gallery featuring a set of vehicle claim images 412. Similar to interface 408, the system (100, 200) may use images selected from interface 411, and specifically from the vehicle claim images 412 to facilitate processing a claim, in accordance with various embodiments described herein.

Figures 4G, 4H:
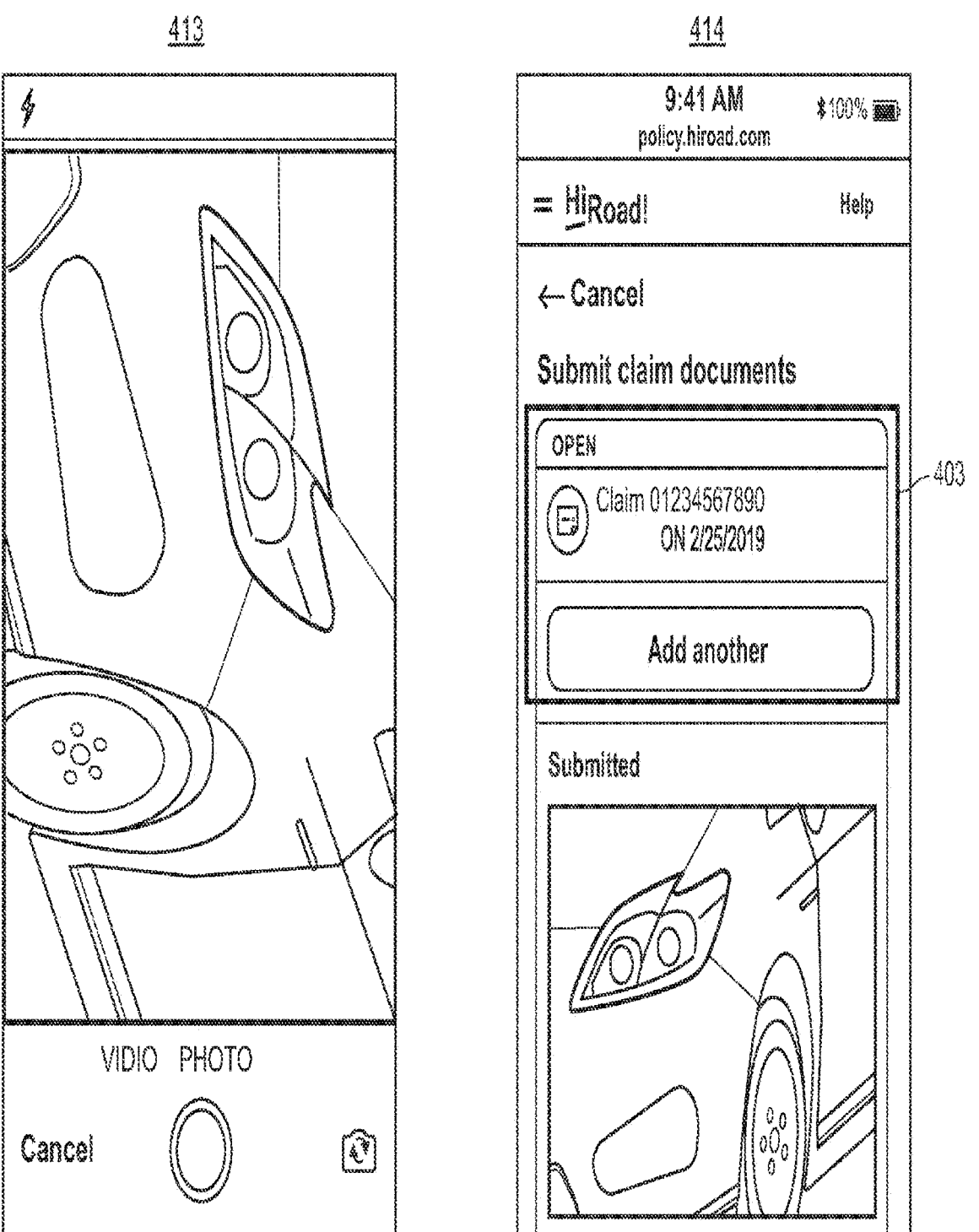

Additionally or alternatively, the application may transition to interface 413, as depicted in FIG. 4G. Interface 413 may represent a field of view (FOV) of a camera (e.g., imaging apparatus 208). In other words, once a user interacts with the requested claim documents area 405 or the claim documents request area 407, the user's device 104 may access the imaging apparatus 208 in order to capture images associated with a claim. Similar to interfaces 408 and 411, the system (100, 200) may use images captured by the imaging apparatus 208 as displayed on interface 413 to facilitate processing a claim, in accordance with various embodiments described herein.

Once selected and/or captured, the images may be displayed in the interface 414, as depicted in FIG. 4H. The interface 414 includes the claim documents request area 403 from interface 402, and additionally features the selected and/or captured image(s) described with reference to FIGS. 4E-4G. Moreover, prior to submission, the application may offer the user an opportunity to caption, comment, or otherwise label the submitted claim documents, as shown in interface 415 of FIG. 4I. The interface 415 includes a comment area 416 a user may use to describe the uploaded claim document.

For example, and as described further herein, the system (100, 200) may use the information the user submits in the comment area 416 to process a claim. More specifically, the system (100, 200) may use the information submitted in the comment area 416 to validate a submitted claim document by, for example, requesting a signature corresponding to a known user. In embodiments, the comment area 416 may serve as a password entry area. To illustrate, the system (100, 200) may authenticate claim submissions through authentication credentials in the form of a registered password associated with an account/user. Thus, once a user enters a claim document to facilitate the system (100, 200) processing a claim, the system (100, 200) may prompt a user to enter the password associated with the account to authenticate the attempted claim document entry.

Figures 4I, 4J:
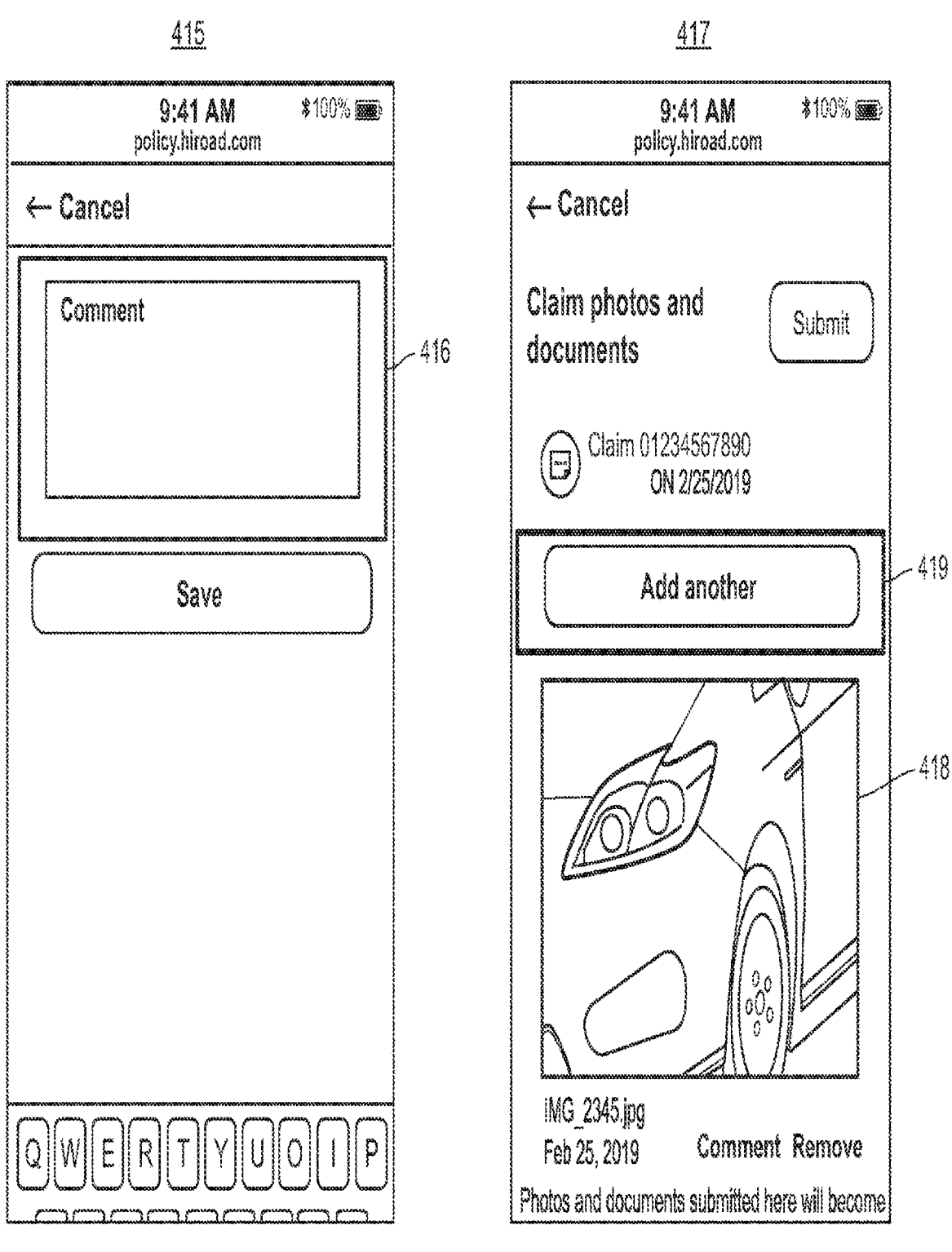

After the system (100, 200) receives a claim document, the application may transition from interface 415 to interface 417, as depicted in FIG. 4J. The interface 417 includes a submitted claim document area 418, and an additional claim document area 419. The submitted claim document area 418 may feature all validly submitted claim documents for a given claim. The submitted claim document area 418 may also include selectable options corresponding to cach validly submitted claim document, such as options to comment (e.g., comment area 416) and/or remove the validly submitted claim document from the claim such that the system (100, 200) will not consider the document when processing the claim. The additional claim document area 419 may include a selectable option for a user to upload additional claim documents related to the claim event.

It should be understood that the functional embodiments of the system (100, 200) described herein may be applicable to both obtaining an initial vehicle profile and obtaining a vehicle profile following a claim event. Further, it should be understood that the "images" or "photos" described in reference to the functional embodiments of the system (100, 200) may be real-time streaming, or pre-recorded video image data to facilitate one or both of obtaining the initial vehicle profile or obtaining the vehicle profile following a claim event.

III. Example of a Method for Obtaining an Initial Vehicle Profile With Image Verification Analytics FIG. 5 is a flowchart depicting an example method 500 corresponding to various embodiments of the present disclosure. The method 500 begins at block 502 where an external processing server (e.g., external processing server 108) receives a geographic location of a vehicle (e.g., vehicle 102) and proximate traffic information. In embodiments, the geographic location of the vehicle is a real-time indication of a location of the vehicle. For example, the external processing server 108 may receive global-positioning system (GPS) data indicative of a real-time geographical location of the vehicle. The GPS data may be received from a GPS module located in the vehicle 102, or from any other suitable location.

In embodiments, the proximate traffic information is indicative of one or more of (i) an amount of expected traffic proximate to the vehicle based on the geographic location of the vehicle or (ii) an amount of actual traffic proximate to the vehicle based on the geographic location of the vehicle. For example, the external processing server 108 may receive an amount of expected traffic proximate to the vehicle 102 indicating the normal/historical traffic patterns for the geographic location. The expected traffic proximate to the vehicle 102 may include timestamps to account for the fluctuations in traffic at a location during the course of a day, week, month, year, etc.; and the external processing server 108 may receive the expected traffic proximate to the vehicle from an external database (e.g., external databases 110), or from an internal expected traffic list maintained at the provider server 106.

The external processing server 108 may receive the amount of actual traffic proximate to the vehicle 102 indicating an amount of real-time traffic proximate to the vehicle 102. The external processing server 108 may additionally determine an amount of actual traffic proximate to the vehicle 102 to utilize in proceeding steps of the method 500 based on their chronological distance from the current time. For example, if the external processing server 108 receives an indication that the traffic proximate to the vehicle 102 was heavier than normal in the preceding 30 minutes, but has since dissipated to normal levels, the external processing server 108 may discount the heavier than normal traffic indication in the proceeding steps of the method 500 as no longer relevant, and thus not include the heavier than normal traffic indication in the actual traffic proximate to the vehicle 102. Moreover, the actual traffic proximate to the vehicle 102 will include timestamps to indicate the current time, and may include seconds, minutes, hours, and a day, week, month, year, etc. The external processing server 108 may receive the actual traffic proximate to the vehicle from an external database (e.g., external databases 110), or from an internal actual traffic list maintained and actively updated at the provider server 106.

The method 500 continues at block 504 by determining a profile safety index based on the geographic location and the proximate traffic information. The profile safety index may be an alphanumerical score or other suitable indication. Block 504 may be performed by, for example, the external processing server 108.

By including the geographic location, the profile safety index may include the inherent geographic complications that a user may face while attempting to obtain the initial vehicle profile. For example, in a mountainous region, the user may be more likely to encounter uneven road/parking surfaces that may lead to trips, falls, or other potentially injurious events. Similarly, the mountainous region may be prone to landslides, falling rocks, or other hazardous conditions that are not conducive to obtaining an initial vehicle profile (e.g., walking around the exterior of the vehicle 102). As discussed further herein, the geographic information may also include weather information indicative of historic weather patterns for the particular geographic location. Should the particular geographic location have a high propensity for thunderstorms, tornadoes, blizzards, or other hazardous environmental conditions, then the safety profile index may decrease for that particular geographic location.

Correspondingly, by including the proximate traffic information, the profile safety index may include the inherent traffic hazards that a user may face while attempting to obtain the initial vehicle profile. For example, for an interstate highway, the proximate traffic information may indicate a high volume of traffic traveling at high speeds. Accordingly, the profile safety index may decrease for that location to indicate the unsafe conditions such a roadway poses to a user attempting to obtain an initial vehicle profile. As another example, for a residential street, the proximate traffic information may indicate a medium volume of traffic traveling at medium speeds. Accordingly, the profile safety index may slightly decrease for that location to indicate the relatively unsafe conditions such a roadway poses to a user attempting to obtain an initial vehicle profile. As yet another example, for a user's driveway, the proximate traffic information may indicate a low volume of traffic traveling at low speeds. Accordingly, the profile safety index may increase for that location to indicate the relatively safe conditions such a roadway poses to a user attempting to obtain an initial vehicle profile.

In embodiments, determining the safety profile index is further based on at least one of (i) a time of day, (ii) a current weather condition at the geographic location, (iii) an expected weather condition at the geographic location, (iv) a historical weather pattern at the geographic location, (v) a make of the vehicle, or (vi) a model of the vehicle. For example, the external processing server 108 may receive this additional information included in the safety profile index from a weather server and/or database (e.g., external databases 110), and may receive the make and model of the vehicle from the provider server 106. The make and model of the vehicle may further inform the safety profile index by, for example, allowing the external processing database 108 to analyze the dimensions of the vehicle prior to a user attempting to obtain the initial vehicle profile.

To illustrate, if the user is attempting to obtain an initial vehicle profile for a large bus, the profile safety index should reflect the fact that the time required to obtain the initial vehicle profile (e.g., capturing video image data of the vehicle 102 exterior) may be greater than the time required to obtain an initial vehicle profile of a mid-size sedan. Hence, because the time required to obtain the initial vehicle profile will be greater for the bus than for the mid-size sedan, the likelihood of factors based on the geographic location and/or proximate traffic information, as described above, impacting the user in their attempt may also be increased.

The method continues at block 506 by transmitting a notification for display on a mobile device indicating whether it is safe to obtain an initial vehicle profile associated with a risk evaluation. Block 506 may be performed by, for example, the external processing server 108.

In embodiments, the profile safety index indicates whether it is safe for the user to obtain the initial vehicle profile. Accordingly, in these embodiments, transmitting the notification for display on the mobile device indicating whether it is safe to obtain the initial vehicle profile may include comparing the profile safety index to a profile safety index threshold. The profile safety index threshold may be a minimum allowable safety index for the user to obtain the initial vehicle profile. For example, if the profile safety index is a numerical score ranging between 0-100, then the profile safety index threshold may be 80. Thus, if the external processing server 108 determines that the profile safety index is equal to 77, the external processing server 108 may transmit a notification indicating that it is unsafe for the user to obtain the initial vehicle profile. Additionally or alternatively, the external processing server 108 may determine a risk indicator that indicates the relative risk associated with attempting to obtain an initial vehicle profile at a certain location. In that instance, if the determined risk indicator is less than or equal to a maximum risk indicator threshold, the external processing server 108 may transmit a message indicating that it is safe to obtain the initial vehicle profile.

It is to be understood that the initial vehicle profile may indicate a first set of images intended to establish a profile and/or coverage policy corresponding to a risk evaluation, a set of images intended to begin the claims process for a risk evaluation, or any combination therein. For example, the initial vehicle profile may include a set of images featuring the vehicle 102 a user may send to a risk evaluating entity (e.g., to the provider server 106) requesting an initial risk evaluation. In another example, the initial vehicle profile may include a second set of images featuring the vehicle 102 a user may send to the risk evaluating entity requesting an evaluation of damage incurred to the vehicle 102 against a pre-established baseline. The pre-established baseline may have been previously established by the user and may include a first set of images featuring the vehicle 102 against which the second set of images may be compared to facilitate the risk evaluating entity's adjustment to an associated risk evaluation.

The method 500 continues at block 508 by capturing video data indicative of the vehicle 102. As mentioned herein, the video data may be real-time streaming data in addition to pre-recorded live video footage indicating the vehicle 102. The vehicle 102 may be indicated in the video data wholly, partly, or as is necessary for the risk evaluation. For example, the imaging apparatus 208 may capture the video data indicative of the vehicle 102 as a user walks around the exterior of the vehicle 102 while holding the user electronic device 104. Block 508 may be performed by, for example, the imaging apparatus 208.

The method 500 continues at block 510 by analyzing the video data to identify a plurality of profile features. The profile features may reference the identification information discussed with reference to FIGS. 3A-3R and 4A-4J (e.g., year, make, model, color, and/or VIN of vehicle 102, etc.). For example, the external processing server 108 may analyze the video data by video analysis techniques including object recognition (OR), object character recognition (OCR), and other suitable methods. Block 510 may be performed by, for example, the external processing server 108.

In embodiments, the video data includes profile features indicative of users performing personal care activities. For example, the video data may include profile features indicative of a user taking a walk, running, stretching, weightlifting, swimming, cooking, a user's diet plan, and/or other activities indicative of a healthy, low-risk lifestyle. In another example, the video data may include profile features indicative of a user rehabilitating an injury (e.g., purchasing knee braces, wrist splints, etc.), performing physical therapy, providing progress charts corresponding to the injury rehabilitation, and/or other activities indicative of risk-reducing physical improvement. Additionally, it is to be understood that such profile features may be applied to various risk evaluations, including but not limited to, personal life insurance policies, health insurance policies, medical risk evaluations (e.g., surgical risk evaluations, treatment risk evaluations), other risk evaluations, and any combination therein.

The method 500 continues at block 512 by determining a first profile feature from the plurality of profile features. The first profile feature may be related to the vehicle 102. For example, if a user is attempting to obtain an initial vehicle profile, the first profile feature may include images of the vehicle taken from each of the various perspectives discussed with reference to FIGS. 3H-3P (e.g., front, driver side, driver side front, driver side rear, passenger side front, passenger side, passenger side rear, rear, etc.). Block 512 may be performed by, for example, the external processing server 108.

In embodiments, the user is attempting to obtain claim documents, as discussed with reference to FIGS. 4A-4J. Thus, the first profile feature may include an image of one, some, or all of the various perspective discussed with reference to FIGS. 3H-3P. To illustrate, if a user is attempting to obtain claim documents, the user may have only damaged one portion of the vehicle 102 (e.g., scraped the front bumper, scratched the driver's side rear panel, etc.). The external processing server 108 may correspondingly determine a first profile feature associated with the scraped front bumper or the scratched driver's side rear panel. Thus, when the user attempts to obtain an initial vehicle profile corresponding to a specific risk evaluation event, the external processing server 108 may determine a first profile feature specific to the risk evaluation event.

The method 500 continues at block 514 by determining a second profile feature from the plurality of profile features. The second profile feature may be related to an image verification indicator. As discussed further herein in reference to FIGS. 3G and 4E, the system (100, 200) may require authentication for any claim documents or other information submitted as part of a risk evaluation. As such, the risk evaluation may require the second profile feature to be included when capturing the video data indicative of the vehicle to perform the authentication, and thus avoid submission issues to increase the overall level of customer service and satisfaction. Block 514 may be performed by, for example, the external processing server 108.

For example, and in embodiments, the second profile feature includes a facial image of the user. Further in these embodiments, the image verification indicator includes a known facial image of the user. Thus, in these embodiments, the system (100, 200) attempts to authenticate the video image data by extracting identifying information corresponding to the user. The external processing server 108 may utilize techniques including pattern recognition algorithms, facial recognition algorithms, OR, OCR, or other suitable extraction methods.

It should be understood that both the first profile feature and the second profile feature may include one or more of the plurality of profile features. As such, and in embodiments, the first profile feature and the second profile feature may be referenced as the "first profile features" and the "second profile features," respectively.

The method 500 continues at block 516 by comparing the second profile feature to the image verification indicator. The image verification indicator may be, for example, a stored image of the user or other extracted characteristics of the user's face based on similar techniques described above (e.g., pattern recognition algorithms, facial recognition algorithms, OR, OCR, etc.). For example, the image verification indicator may be any other identifiable characteristic concerning the user, such as a tattoo, birthmark, hair color, or other characteristic that can be determined by the external processing server 108 or other suitable device using the techniques described above. Additionally or alternatively, the image verification indicator may involve a user including an audial cue (e.g., password, identifying phrase, etc.) that the external processing server 108 or other suitable device will recognize as associated with the user. For example, the server's (106, 108) database (210, 218) may include a known image or characteristics of a user in addition to the phrase/password being spoken in the user's tone of voice (e.g., an audio recording of the user speaking the phrase/password).

The method 500 continues at block 518 by generating an image verification score based on the comparison of the second profile feature to the image verification indicator. The image verification score may be an alphanumerical score or other suitable indication. As mentioned herein, the second profile feature will include similar features as the image verification indicator, and those similar features will be compared to one another to determine the degree of similarity they share. Block 518 may be performed by, for example, the external processing server 108.

In embodiments, generating the image verification score may be based on a comparison of the first profile feature and the second profile feature to the image verification indicator. For example, the image verification indicator may include details corresponding to both the vehicle 102 and the user, such that at least a portion of the first profile feature and at least a portion of the second profile feature may be required for a complete comparison to the image verification indicator. To illustrate, the image verification indicator may include an image of the driver's side front of the vehicle 102 and an image of the user's face. Thus, to generate the image verification score, a user would need to capture at least an image of the driver's side front of the vehicle 102 and their face for a complete comparison. Accordingly, if a user only captures an image of the driver's side front of the vehicle 102 but does not include an image of the user's face, the external processing server 108 may reject the submitted video data because a complete comparison to the image verification indicator could not be performed.

Alternatively, the external processing server 108 may permit incomplete comparisons of the first and second profile features to the image verification indicator if the resulting image verification score is sufficiently high. For example, if the user only captures an image of the driver's side front of the vehicle 102 but does not include an image of the user's face, the external processing server 108 may accept the submitted image if the comparison of the first profile feature to the corresponding component of the image verification indicator (e.g., an image of the driver's side front of the vehicle 102) is sufficiently similar. The external processing server 108 may indicate that the comparison is sufficiently similar if the first profile feature and the image verification indicator share a threshold number of qualities, each of the determined qualities of both images are equal to or above a similarity threshold, or any other suitable metric and/or combination therein.

Moreover, the comparison of profile features to the image verification indicator may include a weighted feature comparison. For example, assume the image verification indicator includes a plurality of features such as a driver's front headlight, driver's front fender, driver's front side mirror, driver's front engine compartment hood, and a damaged hood ornament. Due to the relatively unique quality of the damaged hood ornament, the damaged hood ornament may receive a larger weight than the headlight, fender, side mirror, and engine compartment hood when comparing the first profile feature to the image verification indicator. Thus, if the first profile feature includes an identical damaged hood ornament, the external processing server 108 may generate a high image verification score to reflect the high likelihood that the vehicle 102 indicated in the first profile feature represents the same vehicle 102 indicated by the image verification indicator.

In embodiments, generating the image verification score based on the comparison of the second profile feature to the image verification indicator includes weighting the image verification score based on the geographical location of the vehicle. For example, and as mentioned previously, the video data may include geotagged location data to indicate where the video data was and/or may be obtained. The image verification indicator may include information relating the historical geographical data indicating the typical locations of a vehicle 102 and/or user. Thus, when comparing the second profile feature to the image verification indicator, the external processing server 108 may include the current geotagged location associated with the second profile feature to further inform the image verification score generation. To illustrate, if a vehicle 102 is typically located in a user's driveway, then the external processing server 108 may generate a high image verification score in response to comparing a second profile feature associated with a geotagged location in the user's driveway with the image verification indicator.

Still further in these embodiments, generating the image verification score based on the comparison of the second profile feature to the image verification indicator includes weighting the image verification score based on the geographical location of the vehicle. As described above, certain locations associated with typical locations of a vehicle 102 and/or a user may influence the external processing server's 108 generation of an image verification score. In response to receiving such typical location data, the external processing server 108 may assign weighting values to each received location. Accordingly, the more typical (e.g., frequent) the locations are with respect to the vehicle 102 and/or the user, the higher the weighting values may be. To illustrate, if a vehicle 102 is parked in the user's driveway for a majority of the time indicated by the data received at the external processing server 108, then the external processing server 108 may assign the user's driveway a correspondingly high weighting value. Similarly, if the vehicle 102 was driving on an obscure highway once in the observable lifetime of the vehicle 102, then the external processing server 108 may assign a correspondingly low weighting value to the obscure highway.

The method 500 continues at block 520 by updating the risk evaluation to include the initial vehicle profile based on the first profile feature indicating the image verification score relative to an image verification threshold. For example, the first profile feature may include two or more of the plurality of profile features, and the initial vehicle profile may include one or more of the first profile features. Correspondingly, the initial vehicle profile may indicate each of the features related to an risk evaluation event. Block 520 may be performed by, for example, the provider server 106.

To illustrate, assume the risk evaluation event is a vehicle accident. In this event, the first profile features may include images indicative of, inter alia, a damaged radiator, a damaged front fender, a damaged engine compartment hood, an undamaged passenger front door, and an undamaged passenger rear door. The initial vehicle profile may include only the damaged radiator, the damaged front fender, and the damaged engine compartment hood, to reflect the features of interest, with respect to the risk evaluation. Accordingly, the image verification score may be compared to an image verification threshold, and depending on the results of the comparison, the initial vehicle profile may be included in the risk evaluation (e.g., to facilitate claim processing, medical evaluations/underwriting, mechanic assessments, etc.). For example, the comparison of the image verification score to the image verification threshold may indicate that the image verification score is greater than the image verification threshold, such that the initial vehicle profile is authenticated, and thus should be included in the risk evaluation. It is to be appreciated that the comparison may require the image verification score to satisfy any suitable relationship relative to the image verification threshold (e.g., greater than, less than, equal to, etc.) for the initial vehicle profile to be included in the risk evaluation.

As previously stated, the initial vehicle profile may reference a first set of images intended to establish a risk evaluation profile, policy, and/or other account, a set of images intended to begin the claims process for a risk evaluation, medical evaluation/underwriting, mechanic assessments, etc., or any combination therein. For example, assume the risk evaluation event is a user applying for insurance coverage to comply with state regulations requiring initial vehicle inspections prior to issuing insurance coverage and/or processing insurance claims with respect to the vehicle. In this event, the first profile features may include images indicative of, inter alia, each of the perspectives of the vehicle 102 discussed with reference to FIGS. 3H-3P and an image of the user's face. The initial vehicle profile may include only the perspectives of the vehicle 102, to satisfy the necessary initial vehicle inspection criteria for the relevant state (e.g., Massachusetts may require more perspective images than Florida). Accordingly, based on a comparison of the image verification score to an image verification threshold, the initial vehicle profile may be included in the risk evaluation (e.g., to facilitate insurance acquisition such as insurance deductible estimation, insurance premium estimation, insurance benefits/incentives determinations, etc.).

In embodiments, the video data is a first video data, the plurality of profile features is a plurality of first profile features, and the image verification score is a first image verification score. Moreover, the method 500 may further comprise capturing a second video data indicative of an insurance-related event; analyzing the second video data to identify a plurality of second profile features; determining a third profile feature from the plurality of second profile features, wherein the third profile feature is related to the insurance-related event; determining a fourth profile feature from the plurality of second profile features, wherein the fourth profile feature is related to the image verification indicator; comparing the fourth profile feature to the image verification indicator; generating a second image verification score based on the comparison of the fourth profile feature to the image verification indicator; and updating an aspect of the risk evaluation based on the third profile feature indicating the second image verification score relative to the image verification threshold.

For example, the system (100, 200) may determine that the data included in the initial vehicle profile is insufficient, and thus requires further information to process the initial vehicle profile for a specific risk evaluation event. Thus, the provider server 106 may generate a notification for display on a user interface of the user electronic device 104, indicating that further information is required. Afterwards, the imaging apparatus 208 may capture the second video data, and a plurality of features may be determined from the second video data.

To illustrate, the first video data may not have included a sufficiently clear image of a damaged area of the vehicle 102 for the provider server 106 to include the initial vehicle profile in the risk evaluation. Thus, the provider server 106 may generate a notification instructing the user to capture a second video data including the damaged area in an attempt to create a more illustrative initial vehicle profile corresponding to the risk evaluation event. If the second video data includes a sufficient indication of the damaged area (e.g., the third profile feature), as determined by one or both of the provider server 106 and/or the external processing server 108, then one or both of the provider server 106 and/or the external processing server 108 may modify the initial vehicle profile to include the indication of the damaged area from the second video data.

By providing a system and method that allow obtaining an initial vehicle profile with image verification analytics as described herein, various advantages are achieved. For example, the system and method provide and/or are implemented through the use of a device(s) that provide information particularly suited for use with other features of the system and method to obtain an initial vehicle profile with image verification analytics. Notably, the system and method provide a seamless solution to obtaining an initial vehicle profile with image verification analytics by obtaining and analyzing all necessary data through a single video image data capture. Moreover, the system and method analyze situational data to provide a video image data capture recommendation corresponding to an enhanced safety evaluation. Additionally, the system and method robustly validate the authenticity of each submitted video image data capture through additional feature analytics incorporated in the single video image data capture. These advantageous features collectively facilitate more accurate and expeditious claim verification/processing. Correspondingly, the more accurately and efficiently an evaluating entity (e.g., insurance company) can verify and pay claims, the more satisfied customers may be through receiving lower rates with a higher level of service. Other advantages will be recognized by one of ordinary skill in the art in light of the teaching and disclosure herein.

As will be apparent from the above description, and as should be appreciated with respect to all examples presented herein, the functions or operations shown in FIG. 5 may be performed in any suitable order, any desired number of times, and/or with any suitable variation to the particular order and/or combination shown so as to achieve a desired result, such as a desired manner of obtaining an initial vehicle profile with image verification analytics.

IV. Additional Considerations

The following additional considerations apply to the foregoing discussion. Throughout this specification, plural instances may implement functions, components, operations, or structures described as a single instance. As noted above, although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the user electronic device 104, the provider server 106, the external processing server 108 and/or any other computing devices within the example system 100 in any suitable combination). The routines may be included as part of any of the modules described in relation to FIG. 1 and/or FIG. 2 or as part of a module that is external to the system illustrated by FIG. 1 and/or FIG. 2. For example, the methods or portions thereof may be part of a browser application(s) or an application(s) running on any of the devices in the example system 100 as a plug-in or other module of the browser application. Further, the methods may be employed as "software-as-a-service" to provide, for example, the user electronic device 104, the provider server 106, the external processing server 108, and/or any other computing devices with access to the example system 100 and/or example system 200.

Additionally, certain aspects are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic region (e.g., within a home environment, an office environment, or a server farm). In other example embodiments, the one or more processors or processor-implemented modules may be distributed across a number of geographic regions.

Still further, the figures depict preferred embodiments of an example system 100 and/or example system 200 and methods for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and method for obtaining an initial vehicle profile with image verification analytics. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this document conflicts with any meaning or definition of the same term in a document incorporated by reference, the meaning or definition assigned to that term in this document shall govern. Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The patent claims at the end of this patent application are not intended to be construed under 35 U.S.C. § 112(f) unless traditional means-plus-function language is expressly recited, such as "means for" or "step for" language being explicitly recited in such claims. The systems and methods described herein are directed to an improvement to computer functionality, and improve the functioning of conventional computers.

What is claimed is:

1. A computer-implemented method for image analysis, the computer-implemented method comprising:

receiving at least one image related to an evaluation, wherein the at least one image includes at least one of video data or still image data;

analyzing the at least one image to extract profile features using one or more of a pattern recognition algorithm, a facial recognition algorithm, an object recognition (OR), or an object character recognition (OCR), wherein the profile features, as extracted, include first profile features that relate to a vehicle and second profile features that relate to an image verification indicator, and wherein the second profile features include one or more features related to an identity of a user of the vehicle;

generating an image verification score at least partially based on a first comparison of at least a portion of one or more of the first profile features and the image verification indicator, and a second comparison of at least a portion of one or more of the second profile features and the image verification indicator; and updating a vehicle profile for the vehicle when the image verification score satisfies a predetermined threshold of similarity based on the first comparison and the second comparison.

2. The computer-implemented method of claim 1, wherein the generating the image verification score includes a weighted comparison of the at least the portion of the one or more of the first profile features to the image verification indicator.

3. The computer-implemented method of claim 1, wherein the generating the image verification score includes a weighting of the image verification score based on a geographical location of the vehicle.

4. The computer-implemented method of claim 3, wherein the second comparison of the at least the portion of the one or more of the second profile features and the image verification indicator includes the weighting of the image verification score based on the geographical location of the vehicle.

5. The computer-implemented method of claim 3, wherein the geographical location of the vehicle is based on geotagged location data associated with the at least one image, as received.

6. The computer-implemented method of claim 1, wherein the image verification score is related to fraud prevention.

7. The computer-implemented method of claim 1, wherein the second profile features are fraud prevention indicators.

8. The computer-implemented method of claim 1, wherein the image verification indicator includes one or more of a known facial image of the user, a tattoo of the user, a birthmark of the user, a hair color of the user, an audial cue of the user, or a tone of voice of the user.

9. The computer-implemented method of claim 1, wherein the analyzing the at least one image to extract the profile features is performed by a first server, wherein the receiving the at least one image is performed by a second server, and wherein the first server is a remote server relative to the second server.

10. A computing system for image analysis, the computing system comprising:

one or more processors; and a memory storing instructions that, upon execution by the one or more processors, cause the computing system to perform one or more processes including a method, the method comprising:

receiving at least one image related to an evaluation, wherein the at least one image includes at least one of video data or still image data;

analyzing the at least one image to extract profile features using one or more of a pattern recognition algorithm, a facial recognition algorithm, an object recognition (OR), or an object character recognition (OCR), wherein the profile features, as extracted, include first profile features that relate to a vehicle and second profile features that relate to an image verification indicator, and wherein the second profile features include one or more features related to an identity of a user of the vehicle;

generating an image verification score at least partially based on a first comparison of at least a portion of one or more of the first profile features and the image verification indicator, and a second comparison of at least a portion of one or more of the second profile features and the image verification indicator; and updating a vehicle profile for the vehicle when the image verification score satisfies a predetermined threshold of similarity based on the first comparison and the second comparison.

11. The computing system of claim 10, wherein the generating the image verification score includes a weighted comparison of the at least the portion of the one or more of the first profile features to the image verification indicator.

12. The computing system of claim 10, wherein the generating of the image verification score includes a weighting of the image verification score based on a geographical location of the vehicle.

13. The computing system of claim 12, wherein the second comparison of the at least the portion of the one or more of the second profile features and the image verification indicator includes the weighting of the image verification score based on the geographical location of the vehicle.

14. The computing system of claim 12, wherein the geographical location of the vehicle is based on geotagged location data associated with the at least one image, as received.

15. The computing system of claim 10, wherein the image verification score is related to fraud prevention.

16. The computing system of claim 10, wherein the second profile features are fraud prevention indicators.

17. The computing system of claim 10, wherein the image verification indicator includes one or more of a known facial image of the user, a tattoo of the user, a birthmark of the user, a hair color of the user, an audial cue of the user, or a tone of voice of the user.

18. The computing system of claim 10, wherein the analyzing the at least one image to extract the profile features is performed by a first server, wherein the receiving the at least one image is performed by a second server, and wherein the first server is a remote server relative to the second server.

19. A non-transitory computer-readable medium storing instructions for image analysis, the instructions upon execution by one or more processors of a computing system, cause the computing system to perform one or more processes including a method, the method comprising:

receiving at least one image related to an evaluation, wherein the at least one image includes at least one of video data or still image data;

analyzing the at least one image to extract profile features using one or more of a pattern recognition algorithm, a facial recognition algorithm, an object recognition (OR), or an object character recognition (OCR), wherein the profile features, as extracted, include first profile features that relate to a vehicle and second profile features that relate to an image verification indicator, and wherein the second profile features include one or more features related to an identity of a user of the vehicle;

generating an image verification score at least partially based on a first comparison of at least a portion of one or more of the first profile features and the image verification indicator, and a second comparison of at least a portion of one or more of the second profile features and the image verification indicator; and updating a vehicle profile for the vehicle when the image verification score satisfies a predetermined threshold of similarity based on the first comparison and the second comparison.

20. The non-transitory computer-readable medium of claim 19, wherein the generating the image verification score includes a weighted comparison of the at least the portion of the one or more of the first profile features to the image verification indicator.

\*　　\*　　\*　　\*　　\*